United States Patent
Kim et al.

(10) Patent No.: US 9,924,312 B2
(45) Date of Patent: Mar. 20, 2018

(54) APPARATUS AND METHOD FOR DETERMINING USER'S PRESENCE

(71) Applicant: SAMSUNG ELECTRONICS CO., LTD., Suwon-si, Gyeonggi-do (KR)

(72) Inventors: Kyungjae Kim, Suwon-si (KR); Jieun Kim, Suwon-si (KR); Yunjae Lim, Seoul (KR); Jaewook Kim, Seoul (KR); Hyunsuk Min, Suwon-si (KR); Kwanwoo Song, Yongin-si (KR); Apoorv Kansal, Suwon-si (KR); Byungcheol Yu, Seoul (KR); Hogun Lim, Seoul (KR); Hyejung Cho, Anyang-si (KR); Sangsun Choi, Seoul (KR); Jaeeun Kang, Suwon-si (KR); Changhan Kim, Goyang-si (KR); Jongyoub Ryu, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/361,619

(22) Filed: Nov. 28, 2016

(65) Prior Publication Data

US 2017/0156028 A1    Jun. 1, 2017

(30) Foreign Application Priority Data

Nov. 27, 2015  (KR) .......................... 10-2015-0167925

(51) Int. Cl.
H04W 24/00    (2009.01)
H04W 4/02     (2018.01)
(Continued)

(52) U.S. Cl.
CPC ............. *H04W 4/021* (2013.01); *H04L 43/16* (2013.01); *H04W 4/005* (2013.01); *H04W 4/008* (2013.01); *H04W 52/02* (2013.01); *H04W 88/16* (2013.01)

(58) Field of Classification Search
CPC ..... H04W 4/021; H04W 4/005; H04W 4/008; H04W 52/02; H04W 88/16; H04L 43/16
(Continued)

(56) References Cited

U.S. PATENT DOCUMENTS 7,580,710 B2 *  8/2009  Katz ...................... G01C 21/20
                                                      370/328
8,184,004 B2    5/2012  Roosli
(Continued)

FOREIGN PATENT DOCUMENTS

KR         10-1297112          8/2013

OTHER PUBLICATIONS

Search Report dated Feb. 14, 2017 in counterpart International Patent Application No. PCT/KR2016/013811.

*Primary Examiner* — Khai M Nguyen
(74) *Attorney, Agent, or Firm* — Nixon & Vanderhye P.C.

(57) ABSTRACT

The present disclosure relates generally to a sensor network, Machine Type Communication (MTC), Machine-to-Machine (M2M) communication, and technology for Internet of Things (IoT). The present disclosure may be applied to intelligent services based on the above technologies, such as smart home, smart building, smart city, smart car, connected car, health care, digital education, smart retail, security and safety services.

A communication apparatus performs a method for determining a user's presence in a specific space. In the method, the apparatus receives a first signal from a first sensor and identifies a user access direction, based on the received first (Continued)

signal. Then, the apparatus selects a second sensor, based on the identified user access direction, receives a second signal from the selected second sensor, and determines whether a user enters in the specific space, based on the received second signal.

16 Claims, 21 Drawing Sheets

(51) Int. Cl.
*H04L 12/26* (2006.01)
*H04W 4/00* (2018.01)
*H04W 52/02* (2009.01)
*H04W 88/16* (2009.01)

(58) Field of Classification Search
USPC .............................. 455/456.1, 456.2, 456.5
See application file for complete search history.

(56) References Cited

U.S. PATENT DOCUMENTS

| | | | |
|---|---|---|---|
| 2010/0097226 A1 | 4/2010 | Parsons | |
| 2012/0105193 A1* | 5/2012 | Gritti | G08B 13/00 340/3.4 |
| 2012/0248315 A1* | 10/2012 | Kim | G01V 8/20 250/349 |
| 2013/0204409 A1* | 8/2013 | Shin | H04L 12/12 700/90 |
| 2014/0207721 A1 | 7/2014 | Filson et al. | |
| 2014/0302795 A1* | 10/2014 | Chacon | H04W 4/008 455/41.3 |
| 2014/0379305 A1 | 12/2014 | Kumar | |
| 2016/0007421 A1* | 1/2016 | Tey Pons | H05B 33/0854 315/113 |
| 2016/0335865 A1* | 11/2016 | Sayavong | G08B 13/2491 |

* cited by examiner

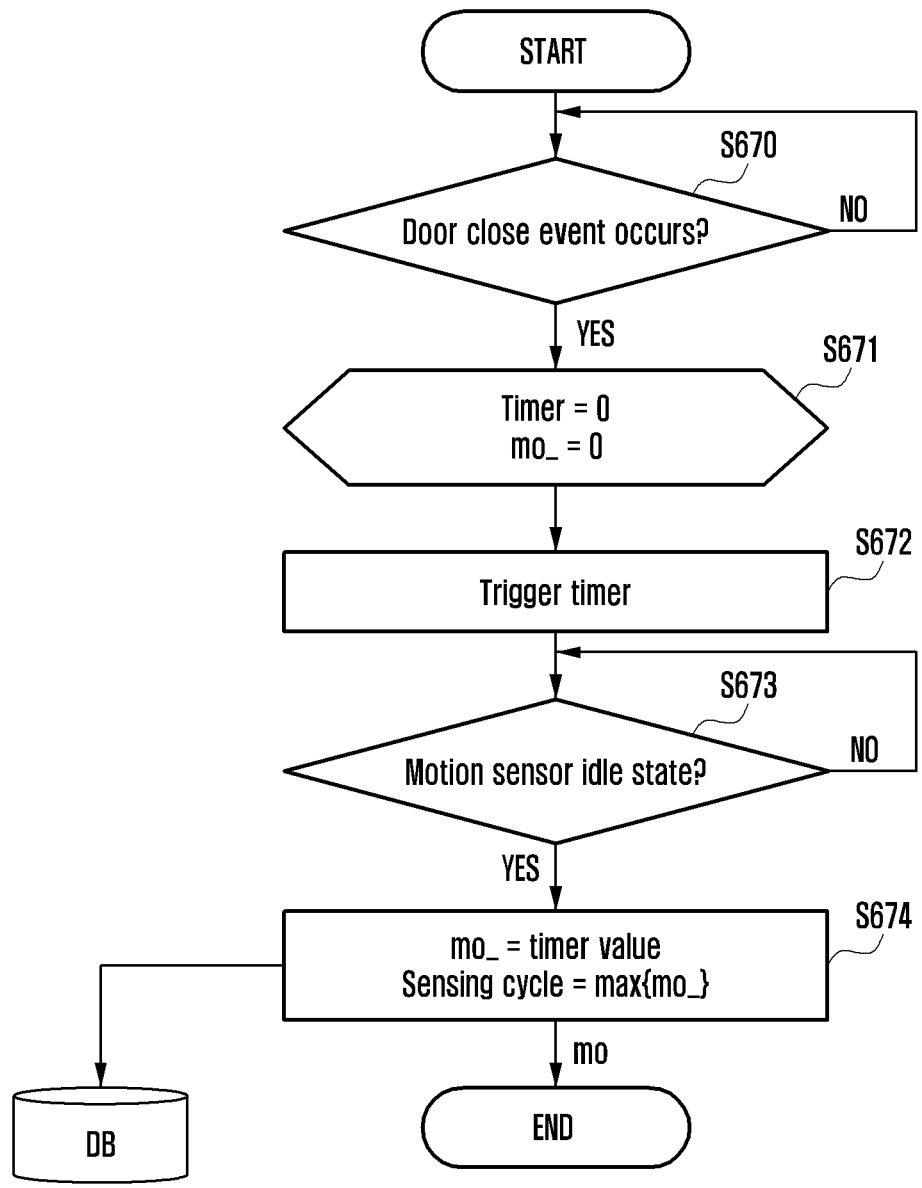

APPARATUS AND METHOD FOR DETERMINING USER'S PRESENCE

CROSS-REFERENCE TO RELATED APPLICATION

This application is based on and claims priority under 35 U.S.C. § 119 to a Korean patent application filed in the Korean Intellectual Property Office on Nov. 27, 2015 and assigned Serial No. 10-2015-0167925, the disclosure of which is incorporated by reference herein in its entirety.

TECHNICAL FIELD

The present disclosure relates generally to an apparatus and method for determining a user's presence and, for example, to an apparatus and method for determining whether a user is present in a specific space through a measuring device, and then, based on a user's presence, controlling an electronic device located in the specific space.

BACKGROUND

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

Meanwhile, in order to increase the efficiency of energy use in a certain space, a method for determining a user's presence in the certain space (hereinafter, determining a user's presence refers to determining whether a user is located or present in the certain space) and then controlling electronic devices located in the certain space may be used. For example, if it is determined that no user is present in the certain space, electronic devices therein may be deactivated for the efficient use of energy.

However, in case of deactivating electronic devices based on incorrect determination about a user' presence, this may cause a user inconvenience.

Accordingly, a method for more accurately determining whether a user is present in a specific space is needed.

SUMMARY

In order to address the aforesaid or any other issue, the present disclosure provides a method for determining a user's presence, based on a specific time (also referred to as motion nonoccurrence duration information) required for determining whether no user is present, and thereby controlling an electronic device.

Additionally, the present disclosure provides a method for measuring a distance between a door and a user through a distance sensor, determining a user's presence based on the measured distance, and thereby controlling an electronic device.

Also, the present disclosure provides a method for identifying a user's access direction using a first sensor, determining a user's entry using a second sensor selected depending on the user's access direction, and thereby controlling an electronic device. In this disclosure, determining a user's entry refers to determining whether a user enters a specific space.

According to an example embodiment of the disclosure, a method for determining a user's presence in a specific space by a communication apparatus includes receiving a first signal from a first sensor; identifying a user access direction, based on the received first signal; selecting a second sensor, based on the identified user access direction; receiving a second signal from the selected second sensor; and determining whether a user enters the specific space, based on the received second signal.

Additionally, the step of determining the user's entry may include identifying the number of users in the specific space; determining motion nonoccurrence duration information for determining the user's presence, based on the number of users; and determining the user's presence in the specific space, based on the motion nonoccurrence duration information.

According to an example embodiment of the disclosure, a communication apparatus for determining a user's presence in a specific space includes a transceiver configured to communicate with another network entity; and a controller configured to receive a first signal from a first sensor, to identify a user access direction, based on the received first signal, to select a second sensor, based on the identified user access direction, to receive a second signal from the selected second sensor, and to determine whether a user enters in the specific space, based on the received second signal.

Additionally, the controller may be further configured to identify the number of users in the specific space, to determine motion nonoccurrence duration information for determining the user's presence, based on the number of users, and to determine the user's presence in the specific space, based on the motion nonoccurrence duration information.

According to example embodiments of the disclosure, based on a specific time required for determining whether no user is present, it is possible to increase the accuracy of determination of a user's presence.

Additionally, by identifying a user's access direction through a first sensor and also determining a user's entry through a second sensor selected depending on the user's access direction, it is possible to increase the accuracy of determination of a user's presence.

Ultimately, the various example embodiments can effectively control an electronic device located in a specific space through a more accurate determination of a user's presence.

BRIEF DESCRIPTION OF THE DRAWINGS

The above and other example aspects and attendant advantages of the present disclosure may be more readily understood and appreciated from the following detailed description, taken in conjunction with the accompanying drawings, in which like reference numerals refer to like elements, and wherein:

FIG. 6C is a flowchart illustrating an example process of determining sensing cycle information according to an example embodiment of the present disclosure;

DETAILED DESCRIPTION

Figure 1:
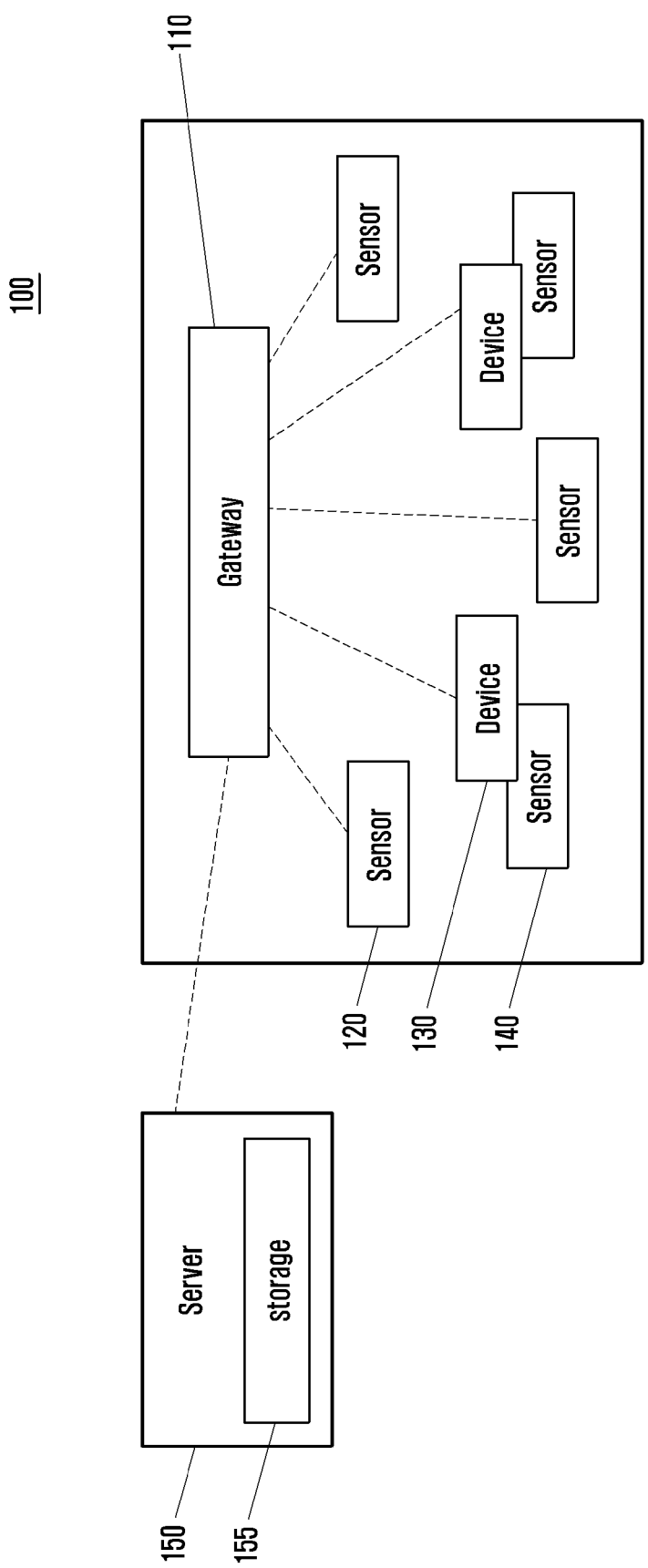
FIG. 1 is a block diagram illustrating an example system for determining a user's presence according to an example embodiment of the present disclosure.

Hereinafter, example embodiments of the present disclosure will be described with reference to the accompanying drawings.

Technical contents well known in the art and having no direct relation to this disclosure may not be described or illustrated in detail to avoid obscuring the subject matter of the present disclosure. Through the drawings, some elements may be exaggerated, omitted or schematically depicted. The same or similar reference numerals denote corresponding features consistently.

Advantages and features of this disclosure and methods for achieving them will become clear with reference to the example embodiments together with drawings. The present disclosure is, however, not limited to the example embodiments set forth herein and may be embodied in many different forms. Rather, the disclosed example embodiments are provided so that this disclosure will be thorough and complete, and will convey the scope of the disclosure to those skilled in the art, as defined by the appended claims.

It will be understood that each block of the flowchart illustrations, and combinations of blocks in the flowchart illustrations, can be implemented by computer program instructions. These computer program instructions can be provided to various processing circuitry, such as, for example, and without limitation, a dedicated processor, a processor of a general purpose computer, special purpose computer, or other programmable data processing apparatus to produce a machine, such that the instructions, which are executed via the processor of the computer or other programmable data processing apparatus, which cause the processing circuitry to perform operations for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including stored instructions that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

Each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein, may refer to a software or hardware component or device, such as, for example, a dedicated processor, processing circuitry, an FPGA or ASIC, or the like, which performs certain tasks. A unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

FIG. 1 is a block diagram illustrating an example system 100 for determining a user's presence according to an example embodiment of the present disclosure.

Referring to FIG. 1, the system 100 may include a communication apparatus (e.g., including communication circuitry) 110, a first-type sensor 120, a device 130, a second-type sensor 140 attached to the device 130, and a server 150. The server 150 may include a storage unit 155.

The sensors 120 and 140 may include various sensing circuitry used for determining a user's presence. The first-type sensor 120 may be located alone in a specific space, and the second-type sensor 140 may be attached to the device 130 located in the specific space. Additionally or alternatively, such sensors may be contained in the communication apparatus 110.

The communication apparatus 110, the first-type sensor 120, the device 130, and the second-type sensor 140 may be located in a certain space, e.g., in an office, in a warehouse, in a house, or in a hotel. Although a hotel is used to aid in understanding of the description of the example embodiments of the present disclosure, this is an example only and not to be construed as a limitation.

The communication apparatus 110 may include various communication circuitry and may be implemented as a gateway. Additionally, the communication apparatus 110 may be connected to at least one of the devices 130 and the sensors 120 and 140 through a short range wireless communication. Thus, using the short range wireless communication, the communication apparatus 110 may receive information measured by the first-type sensor 120 or the second-type sensor 140.

For example, using the sensors 120 and 140, the communication apparatus 110 may determine the number of users located in a specific space. Additionally, using the sensors 120 and 140, the communication apparatus 110 may detect motions (also referred to as a motion event) of such users located in the specific space. Further, using the sensors 120 and 140, the communication apparatus 110 may detect controls (also referred to as a control event) of such users located in the specific space. Based on such information, the communication apparatus 110 may determine whether a user is located in the specific space. The foregoing will be described in greater below.

In case of combining received measurement information, the communication apparatus 110 may determine a user's presence through a process of transforming and combining the measurement information to meet a predetermined data format, and then transmit information for controlling the device 130 to the server 150.

The communication apparatus 110 may be contained in one of devices located in a specific space or may be located as a separate device in the specific space.

The first-type sensor 120 may be used to collect information for determining a user's presence. The sensor 120 may be connected to the communication apparatus 110 or contained in the communication apparatus 110. Also, the sensor 120 may be contained in a specific device. This sensor 120 may include various sensing circuitry configured to perform sensing continuously or in response to a driving command of the communication apparatus 110. When sensing information is changed or in response to a request of the communication apparatus 110, the sensor 120 may transmit measured information to the communication apparatus 110.

The second-type sensor 140 may perform the same function as the first-type sensor 120. For example, the sensor 140 attached to the device 130 may send measured information to the communication apparatus 110 when sensing information is changed or in response to a request of the communication apparatus 110.

Also, each of the sensors 120 and 140 may store sensing results in a storage thereof.

The server 150 may include, for example, a server equipped in a hotel management system or a building management system. Additionally, the server 150 may receive information associated with a user's presence, determined by the communication apparatus 110, and also store the received information in the storage 155. The server 150 may transform the received information to meet a predetermined data format and then store it in the storage 155. Also, the server 150 may transmit the received information to a manager's portable device or computer.

If it is determined through information received from the communication apparatus 110 that a user is present or absent, the server 150 may control the devices 130 in the specific space based on the state of the space. This control for the devices 130 may be performed by the communication apparatus 110.

Figure 2:
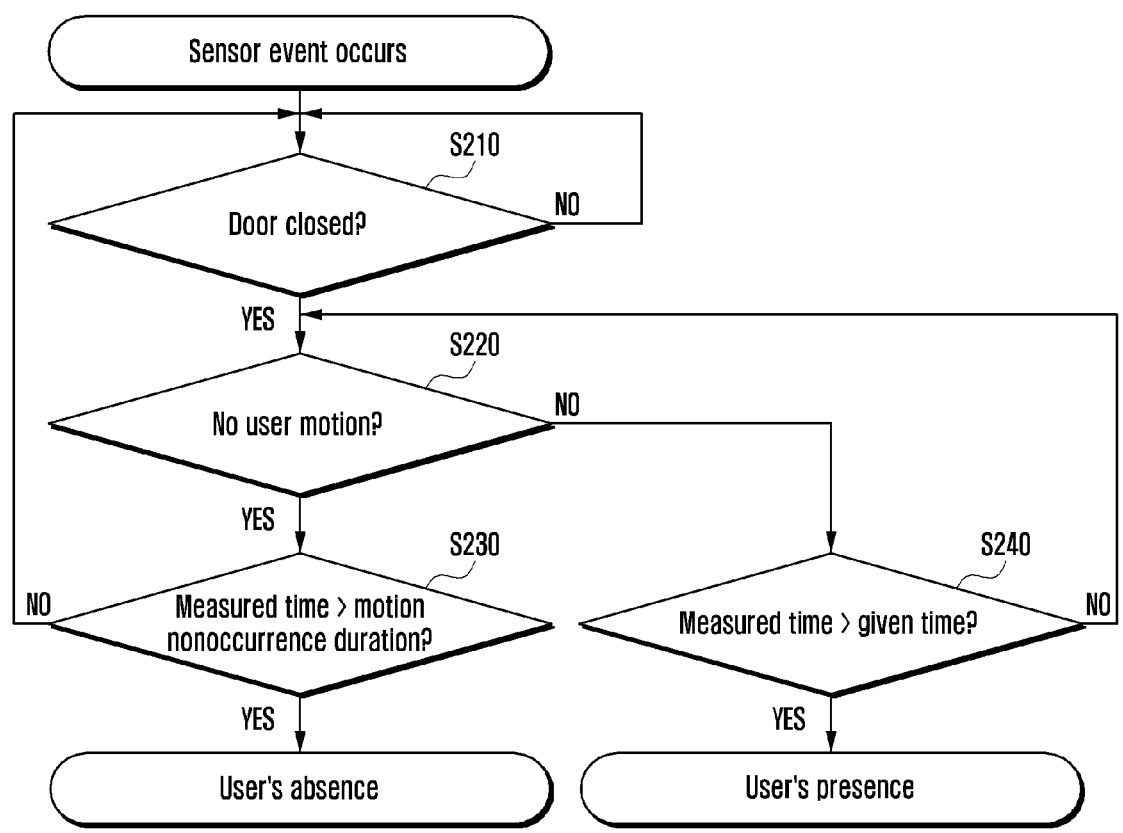
FIG. 2 is a flowchart illustrating an example method for determining a user's presence according to an example embodiment of the present disclosure.

FIG. 2 is a flowchart illustrating an example method for determining a user's presence according to an example embodiment of the present disclosure.

Referring to FIG. 2, when any event occurs at the sensor, the communication device may determine at step S210 whether the door is closed.

The occurrence of a sensor event may include a case of detecting a specific event at the sensor. In this example, the specific event may include the above-mentioned motion event or control event. Although the disclosure describes a motion event or a control event for description, this is an example only and not to be construed as a limitation. Any other example of detecting a user's motion at any other sensor such as a contact sensor located in a specific space may be available according to the present disclosure.

When any user's motion occurs, the motion sensor may detect the user's motion (namely, the occurrence of a motion event). The communication apparatus may detect at step S210, using a sensor attached to the door (hereinafter, referred to as a door sensor), whether the door is closed.

If the door is not closed, the communication apparatus cannot exactly know a user's entry into a specific space. Therefore, the communication apparatus may not perform a next step until the door is closed.

If it is determined that the door is closed, the communication apparatus may further determine at step S220 whether there is no user's motion in the specific space.

If there is no user's motion, the communication apparatus may further determine at step S230 whether a time measured during no user's motion is greater than a predetermined time (i.e., motion nonoccurrence duration information).

If the measured time is greater than the motion nonoccurrence duration information, the communication apparatus may determine that a user is absent.

For example, when there is no user's motion for a given time after the door is closed, the communication apparatus may determine that a user is absent.

On the other hand, if it is determined at step S220 that there is any user's motion, the communication apparatus may determine that a user is present in the specific space. For example, after any user's motion is detected, the sensor may not detect a user's motion for a specific time. For example, the sensor may not perform sensing for ten minutes after the detection of user's motion. Therefore, for a while, the sensor may be maintained in a state where a user's motion is detected. Even in case it is determined at step S220 that a user's motion is detected, this may be caused by information detected before the close of the door. Accordingly, the communication apparatus may determine at step S240 whether a time for which a user's motion is detected is greater than a given time. If so, the communication apparatus may determine that a user is present in the specific space.

Meanwhile, the sensor equipped in the specific space, such as a motion sensor for detecting a user's motion, may be powered by a battery. Therefore, if the sensor operates continuously, a problem that the battery lifetime is shortened may be caused. Thus, in order to prevent and/or reduce the overuse of a battery, the sensor may stop operating for a certain time after the detection of user's motion.

For example, suppose that a user goes out of a room by opening a door and then enters the room again. Since the motion sensor has already sensed a user's motion when the user exits the room, the motion sensor may stop sensing a user's motion for a specific time. Therefore, if the user does not move for certain reasons such as TV watching while the motion sensor stops sensing a user's motion, the motion sensor may fail to detect a user's motion. As a result, the communication apparatus may determine that a user is absent, and thereby control electronic devices such as turning off the lights or the air conditioner. As such, in case the communication apparatus fails to accurately determine a user's presence and thereby wrongly control the electronic devices, the user may feel very uncomfortable. Accordingly, a method for more accurately determining whether a user is present in the specific space is required.

Figure 3:
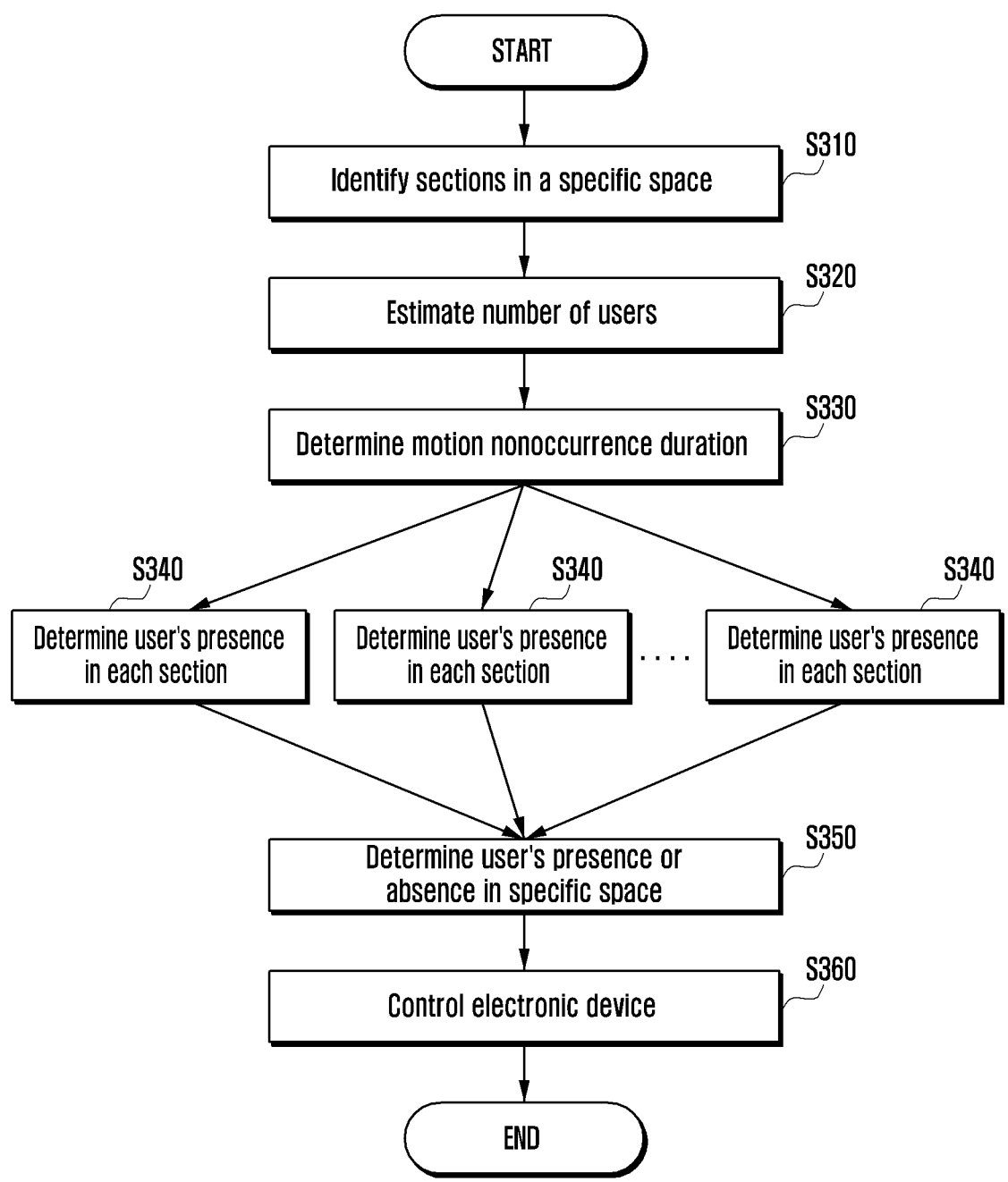
FIG. 3 is a flowchart illustrating an example method for determining a user's presence according to an example embodiment of the present disclosure.

FIG. 3 is a flowchart illustrating an example method for determining a user's presence according to an example embodiment of the present disclosure.

Referring to FIG. 3, the communication apparatus located in a specific space may identify sections included in the specific space at step S310. For example, the communication apparatus may determine whether the specific space is formed of a plurality of sections or a single section. Alternatively, this information about the formation of sections may be previously stored in the communication apparatus.

Depending on the number of sections included in the specific space, a process of determining a user's presence may be different. The foregoing will be described in greater detail below.

The communication apparatus that identifies the section of the specific space may estimate the number of users at step S320. The communication apparatus may estimate the number of users through a device status or control information.

For example, when user's motions are simultaneously sensed in different spaces, the communication apparatus may estimate that there are at least two users in the specific space. Also, when user's motions are sensed within a predetermined time in different spaces, the communication apparatus may estimate that there are at least two users.

Additionally, when a control event of controlling an electronic device, a motion event detected through a motion sensor, and an opening/closing event of a door detected through a door sensor are simultaneously detected, the communication apparatus may estimate the number of users using detected information. The foregoing will be described in greater detail below.

The method for determining a user's presence in the specific space may be varied based on the estimated number of users. The foregoing will also be described in greater detail below.

The communication apparatus that estimates the number of users may determine motion nonoccurrence duration information at step S330. As discussed above, in order for the communication apparatus to determine that a user is absent, no user's motion should be detected for a specific time. This specific time may be referred to as motion nonoccurrence duration.

If no user's motion is detected for the motion nonoccurrence duration, the communication apparatus may determine that a user is absent in the specific space.

If the motion nonoccurrence duration is set to be too short, the communication apparatus may incorrectly determine that a user is absent in the specific space even though the user is present in the specific space and merely does not move for a while. On the other hand, if the motion nonoccurrence duration is set to be too long, the electronic devices may operate continuously even though the user is absent in the specific space. This may cause a lower energy efficiency. Therefore, an example embodiment of the present disclosure provides a method for determining appropriate motion nonoccurrence duration.

The motion nonoccurrence duration may be determined depending on the number of sensors or the structure of a specific space. Additionally or alternatively, the motion nonoccurrence duration may be determined depending on the number of users located in the specific space.

For example, if there are a small number of sensors to detect a user's motion, it may be difficult to detect the user's motion. Thus, in this example, the communication apparatus may set the motion nonoccurrence duration to be relatively long in comparison with another case of a large number of sensors.

On the other hand, if there are a large number of users in the specific space, the sensor may easily sense a user's motion. Thus, in this example, the communication apparatus may set the motion nonoccurrence duration to be relatively short in comparison with another case of a small number of users. The above is, however, merely an example with regard to a correlation between the number of sensors and the motion nonoccurrence duration. In another example, even though many users are located in the specific space, the motion nonoccurrence duration may be not set to be relatively short because such users may be sleeping.

The motion nonoccurrence duration may be determined using a time to determine a user's presence and using sensing cycle information. The foregoing will be described in greater detail below.

Thereafter, at step S340, the communication apparatus determines a user's presence in each section. If no user's motion is detected during the motion nonoccurrence duration in a specific section, the communication apparatus may determine that the user is absent from the section.

The communication apparatus that determines a user's presence in each section may further determine a user's presence in a specific space at step S350. As discussed above, this specific space may refer to a particular area in which the communication apparatus is located and allows communication with other devices. The specific space may include a certain space inside a building or a certain space that allows the communication apparatus located outside a building to communicate with other devices.

For example, the entire room of a hotel, a bedroom part thereof, a bathroom part thereof, and the like may be a specific space.

If it is determined that the user is absent from all the sections of the specific space, the communication apparatus may determine that the user is absent from the specific space.

The communication apparatus that determines a user's presence in the specific space may control the electronic device in the specific space at step S360, based on a result of the above determination. For example, if it is determined that the user is absent, the communication apparatus may stop the operation of the electronic device in the specific space so as to increase energy efficiency.

The communication apparatus may transmit the determination result to the server such that the server may control the electronic device in the specific space through the determination result.

Alternatively, whenever determining a user's presence in each section, the communication apparatus may control the electronic device located in each section.

Figure 4:
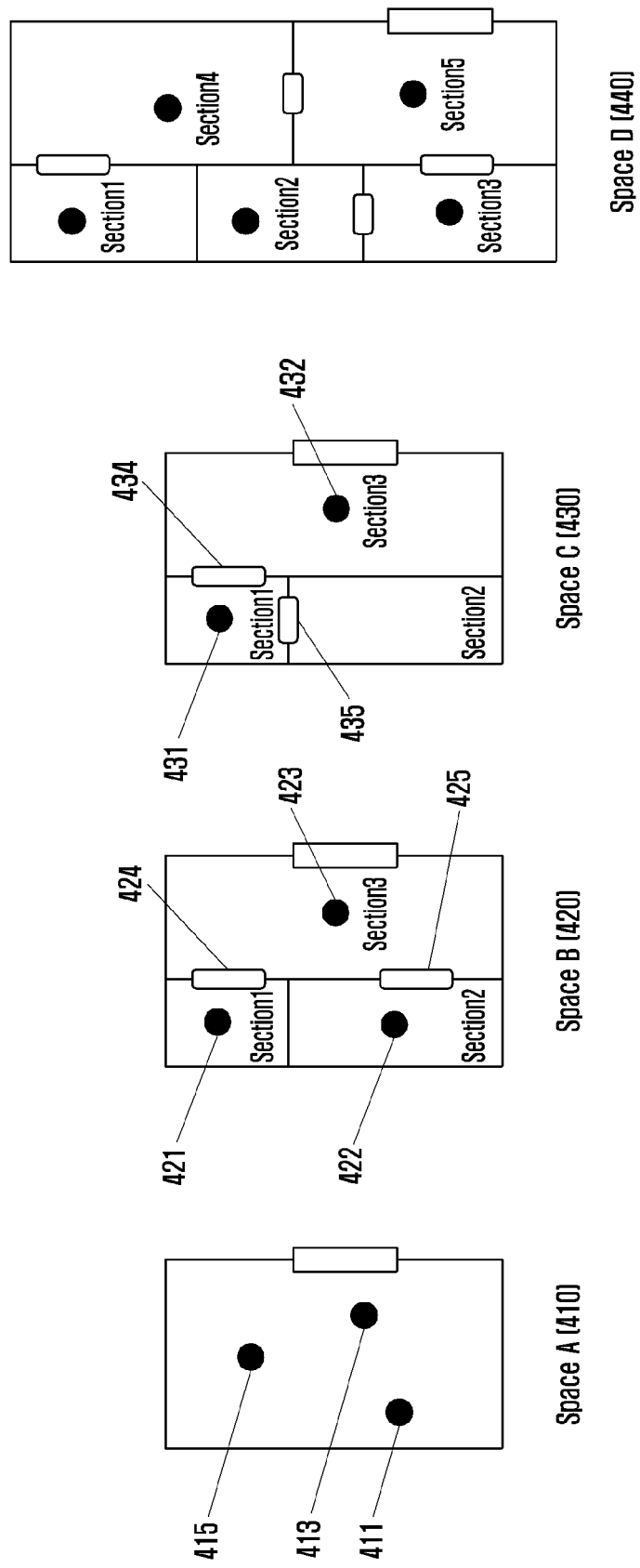
FIG. 4 is a diagram illustrating an example specific space divided into sections based on types and locations of sensors according to an example embodiment of the present disclosure.

FIG. 4 is a diagram illustrating an example of a specific space divided into sections based on types and locations of sensors according to an example embodiment of the present disclosure.

The communication apparatus may identify sections included in a specific space at step 310. Some examples of such sections are illustrated in FIG. 4.

Referring to FIG. 4, a specific space may be formed of a single section or a plurality of sections. For example, a single section may refer to a certain area which is not divided nor partitioned.

In case a specific space is formed of a single section, all the motion sensors may be included in the single section. For example, the space A 410 may include three motion sensors 411, 413 and 415.

On the other hand, the specific space may be divided or partitioned into two or more sections. For example, if a hotel may have several sections such as a bedroom, a living room, a bathroom, a balcony, and the like. The plurality of sections may be defined as a physical division, a logical division, or virtual division based on the unit of sensors.

For example, the space B 420, the space C 430, and the space D 440 are formed of three sections, three sections, and five sections, respectively.

In these examples, the respective sections of each space may contain different sensors. For example, the respective sections of the space B 420 may contain motion sensors 421, 422 and 423, whereas, in case of the space C 430, the sections 1 and 3 only may contain motion sensors 431 and 432.

Additionally, the space B 420 may contain a door sensor 424 between the sections 1 and 3 and a door sensor 425 between the sections 2 and 3 while having no door sensor between the sections 1 and 2.

Additionally, the space C 430 may contain a door sensor 434 between the sections 1 and 3 and a door sensor 435 between the sections 1 and 2 while having no door sensor between the sections 2 and 3.

Additionally, the space D 440 may contain the motion sensor at each section and also have the door sensor between all adjacent sections except between the sections 1 and 2.

Figure 5:
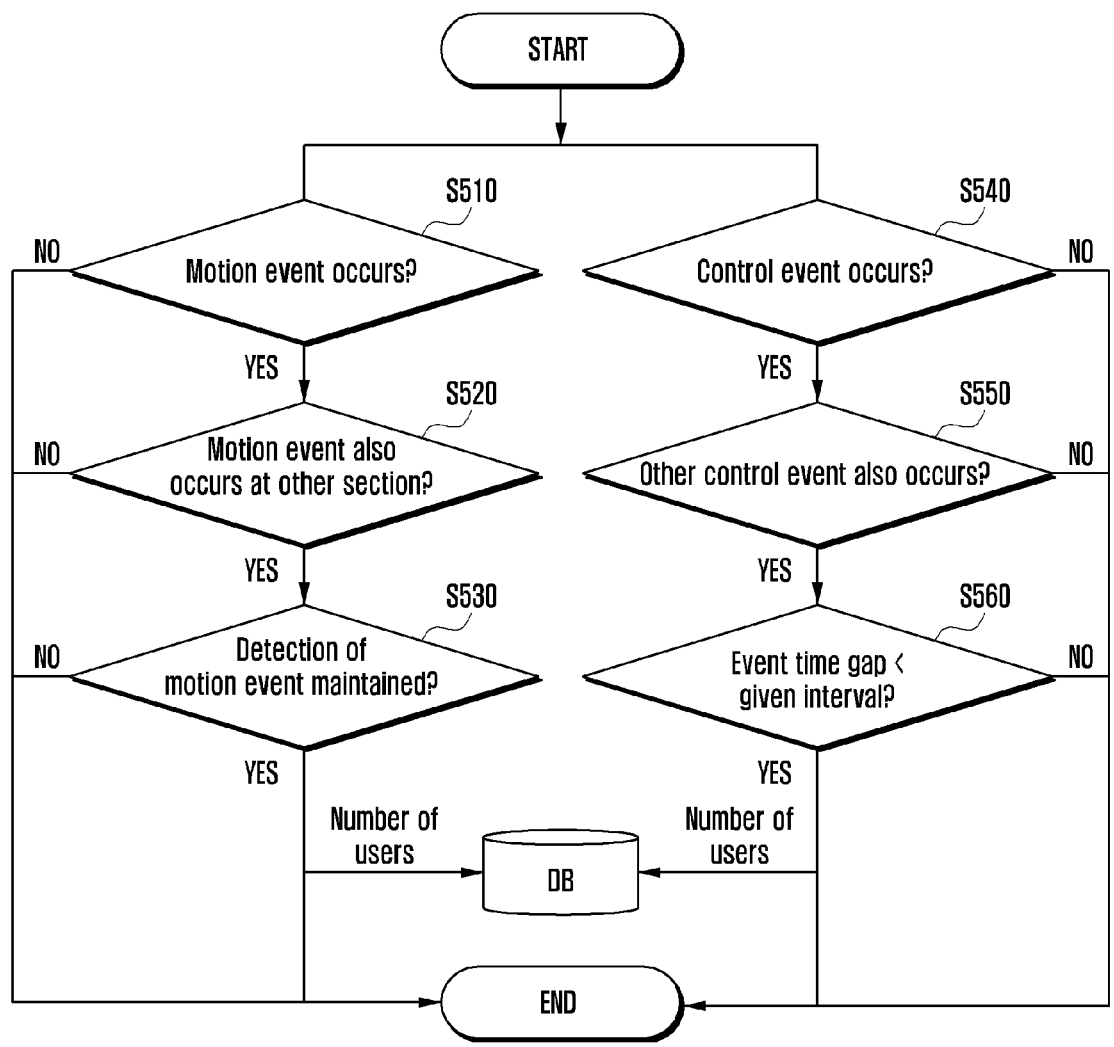
FIG. 5 is a flowchart illustrating an example method for determining the number of users by a communication apparatus according to an example embodiment of the present disclosure.

FIG. 5 is a flowchart illustrating an example method for determining the number of users by a communication apparatus according to an example embodiment of the present disclosure.

As earlier discussed at step S320 in FIG. 3, the communication apparatus may estimate the number of users. Determining a number of users is now described in greater detail with reference to FIG. 5.

Referring to FIG. 5, at step S510, the communication apparatus may determine whether a motion event occurs. As discussed above, the motion event may refer to an event in which a user's motion is detected.

When any motion event occurs, the communication device may determine at step S520 whether another motion event also occurs in any other section. Further, the communication apparatus may determine whether motion events simultaneously occur at different motion sensors located in the same section. Additionally, the communication apparatus may determine whether motion events are detected by different motion sensors within a predetermined time.

In this example, the predetermined time may be determined using a distance and travel path between motion sensors.

For example, if one motion event occurs in a living room and then if another motion event occurs in a bathroom within the predetermined time (e.g., one second), the communication apparatus may estimate that there are two or more users.

If motion events occur simultaneously, the communication apparatus may further determine at step S530 whether the detected motion events are maintained together.

When different motion events occur simultaneously in different sections, or when different motion events are detected simultaneously by different motion sensors located in the same section, or when different motion events are detected by different motion sensors within a predetermined time, the communication apparatus may change the number of users stored in the database (DB) only if the detected motion events are maintained together. In such examples, the communication apparatus may estimate the number of users, based on the number of simultaneously occurring motion events, and then change the number of users stored in the DB.

Meanwhile, in case a control event occurs, the communication apparatus may estimate the number of users in the similar manner as discussed above.

At step S540, the communication apparatus may determine whether a control event occurs. As discussed above, the control event may refer to an event in which a user controls an electronic device.

For example, a case of turning on a TV or light by a user may correspond to the occurrence of the control event. The control event may be detected by an electronic device and then transmitted to the communication apparatus.

When any control event occurs, the communication device may determine at step S550 whether another event also occurs.

If another control event also occurs, the communication apparatus may further determine at step S560 whether a time gap between the occurring control events is smaller than a given time interval. If the time gap between the control events is greater than the given time interval, this may indicate that one user moves and then controls electronic devices individually.

In this example, the given time interval may be determined using a distance, time, and travel path between electronic devices where the control events occur. For example, if a time required for moving from a TV to a switch A is five seconds, this may be used as the given time interval.

If the time gap between the control events is smaller than the given time interval, the communication apparatus may change the number of users stored in the DB. In this example, the communication apparatus may estimate the number of users, based on the number of control events, and then change the number of users stored in the DB.

Although not shown in the drawings, the communication apparatus may estimate the number of users by considering both the motion event and the control event. For example, when any motion event and any control event occur at the same time, or when any motion event and any control event occur within a time gap smaller than a given time interval, the communication apparatus may estimate the number of users using the number of such occurring events. In this example, the given time interval may be determined based on a distance between a motion sensor, which detects the motion event, and an electronic device where the control event occurs.

Figure 6A:
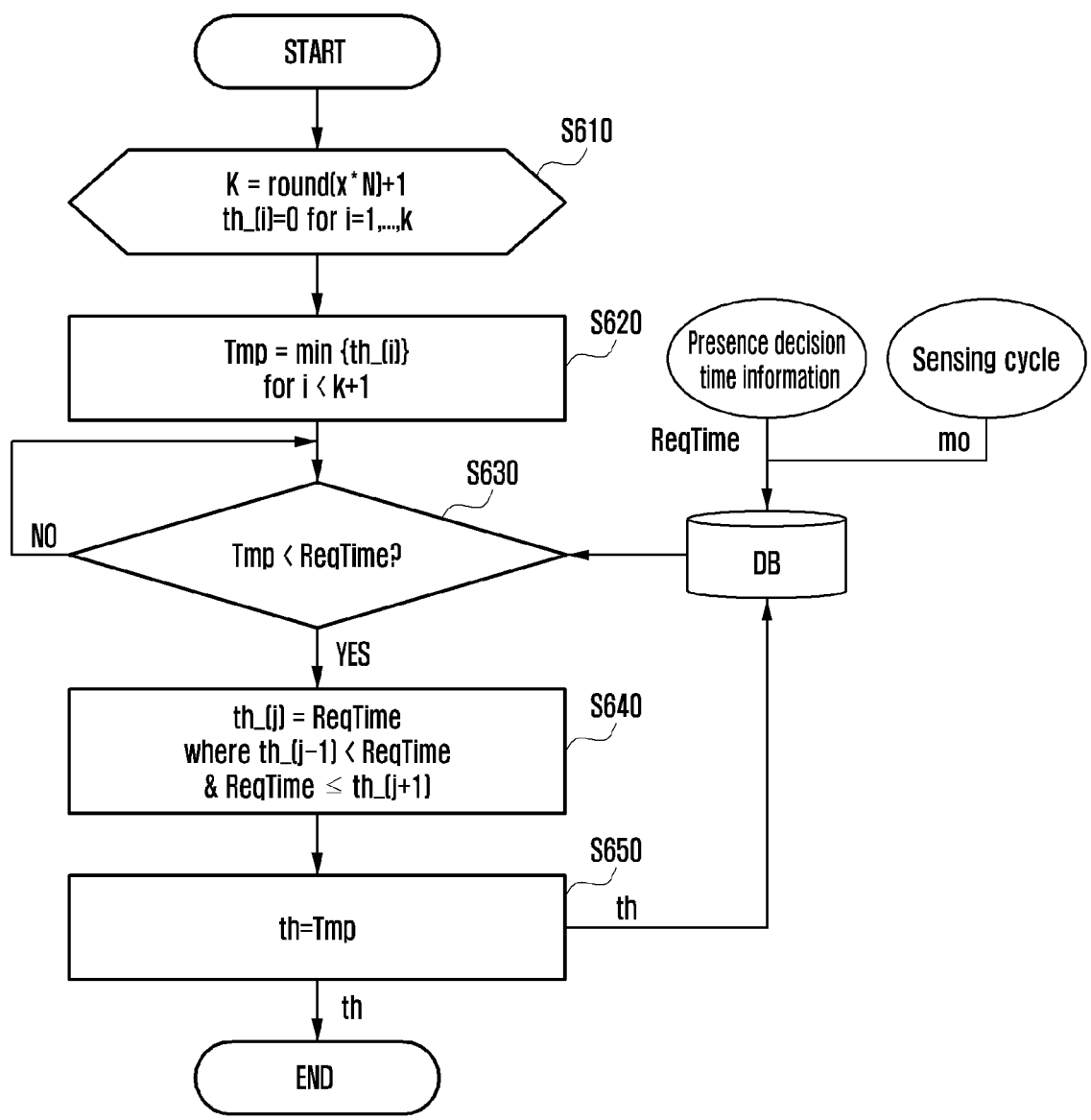
FIG. 6A is a flowchart illustrating an example process of determining motion nonoccurrence duration information to be used for determining a user's presence according to an example embodiment of the present disclosure.

FIG. 6A is a flowchart illustrating an example process of determining motion nonoccurrence duration information to be used for determining a user's presence according to an example embodiment of the present disclosure.

As discussed above, if a user enters a specific space and then does not move while a sensor such as a motion sensor does not operate, the communication apparatus may fail to accurately determine a user's presence.

Therefore, the communication apparatus may measure and store a presence decision time with regard to each user. Herein, the presence decision time may include, for example, a time span from a user's entry into the specific space to a user's initial motion. The presence decision time may be used together with motion nonoccurrence duration candidate.

The communication apparatus may determine motion nonoccurrence duration using the presence decision time and accuracy.

This accuracy may be set in advance or set dynamically depending on situations. For example, if there are a small number of electronic devices to be controlled, the communication apparatus may set the accuracy to be relatively low. On the other hand, if there are a large number of electronic devices to be controlled, the communication apparatus may set the accuracy to be higher.

Any inaccurate determination about a user's presence may cause user's inconvenience. Therefore, the accuracy may be decided at operator's or manager's request. For example, if an operator or manager gives priority to energy savings, the operator or manager may set the accuracy to be relatively low. In such a case, the communication apparatus may determine a user's absence relatively quickly, so that an energy saving effect may be increased.

On the other hand, if an operator or manager gives priority to a customer service, the operator or manager may set the accuracy to be relatively high. Therefore, the communication apparatus may determine a user's presence more accurately, so that any customer's inconvenience may be reduced.

For example, if the accuracy is set as 98%, the communication apparatus may determine 98% of the stored presence decision time information as the motion nonoccurrence duration information.

As discussed above, the motion nonoccurrence duration may be determined in view of the structure of a space, the number of users, or the like. Therefore, the final motion nonoccurrence duration may be determined by further considering the structure of a space, the number of users, etc. from the motion nonoccurrence duration determined using the accuracy.

FIG. 6A illustrates the above process in a flowchart in which x may denote the accuracy and N may denote the number of pieces of information.

Referring to FIG. 6A, at step S610, the communication apparatus determines a k-value using the accuracy (x) and the number of samples (N) for determining a user's presence, and then sets k-numbers of th-values to zero.

At step S620, the communication apparatus sets a Tmp value to the minimum value of th.

At step S630, the communication apparatus determines whether the Tmp value is smaller than the presence decision time information (Reqtime).

Herein, the presence decision time information may refer to information associated with a time span from a user's entry into a specific space to the initial occurrence of a user's motion.

If the Tmp value is smaller than the presence decision time information, the communication apparatus sets the th-value to the presence decision time information at step S640 and then stores the th-value as the Tmp value in the DB at step S650. By repeatedly performing the steps S630 to S650, the communication apparatus may determine the motion nonoccurrence duration information.

A process for determining information associated with a sensing cycle and presence decision time information, needed for the determination of the motion nonoccurrence duration information, will be described in greater detail with reference to FIGS. 6B and 6C.

Figure 6B:
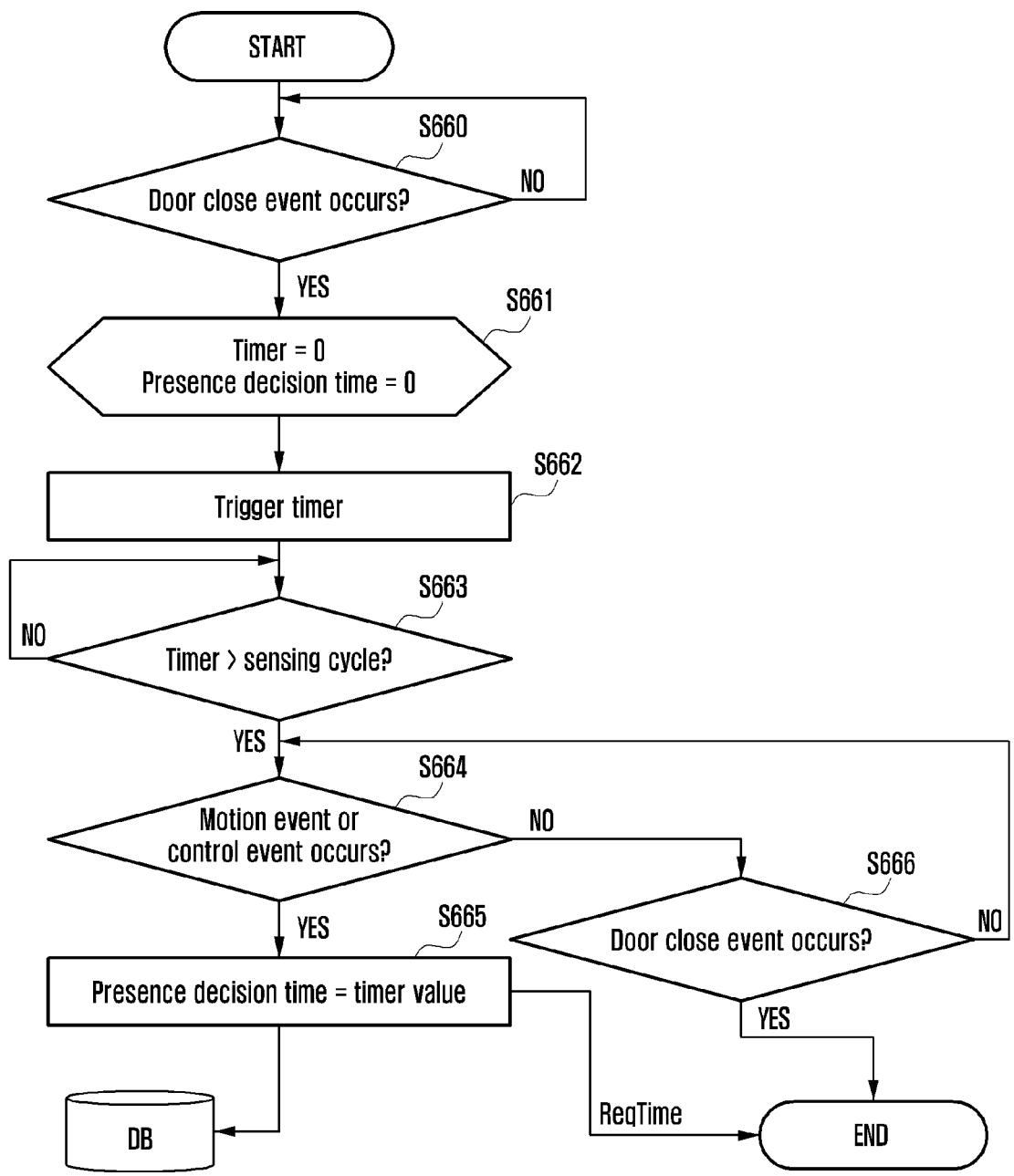
FIG. 6B is a flowchart illustrating an example process of determining presence decision time information according to an example embodiment of the present disclosure.

FIG. 6B is a flowchart illustrating an example process of determining presence decision time information according to an example embodiment of the present disclosure.

Referring to FIG. 6B, the communication apparatus may determine at step S660 whether a door closing event occurs. Using a door sensor equipped in a door, the communication apparatus may determine whether the door is closed.

If the door is closed, the communication apparatus may set a timer value and a presence decision time information value to zero at step S661.

At step S662, the communication apparatus triggers a timer.

At step S663, the communication apparatus may determine whether the timer value is greater than a sensing cycle.

Herein, the sensing cycle may refer to an interval of time during which a sensor such as a motion sensor does not operate after the detection of user's motion. For example, after the door is closed, the sensor may not operate for a certain time, and this may be referred to as the sensing cycle. This non-operation of the sensor is intended to increase the battery efficiency of the sensor. Although the motion sensor is described as an example in this embodiment, this disclosure is not limited to such examples.

If the timer value is smaller than the sensing cycle, the motion sensor may fail to detect a user's motion. Thus, the communication apparatus performs again the step S663.

If the timer value exceeds the sensing cycle, the communication apparatus may determine at step S664 whether a motion event or a control event occurs.

If any motion event or control event occurs, the communication apparatus may determine, as the presence decision time information, the timer value until the occurrence of the motion event or control event, and then store it in the DB at step S665.

If neither motion event nor control event occurs, the communication apparatus may determine at step S666 whether a door closing event occurs. For example, since the door closing event has already occurred, the communication apparatus may determine whether, after any door opening event, the door closing event occurs again. The reason is that the presence decision time information cannot be checked when the door is opened and then closed again in a situation where no event occurs. Therefore, even when the door closing event occurs, the communication apparatus may terminate this process.

If the door closing event does not occur, the communication apparatus may return to the step S664.

As such, the communication apparatus may measure a time until any motion event or control event is detected after door closing, then store the measured time as the presence decision time information, and use this to determine the motion nonoccurrence duration information.

FIG. 6C is a flowchart illustrating an example process of determining sensing cycle information according to an example embodiment of the present disclosure.

As discussed above, the sensing cycle information may refer to an interval of time during which the motion sensor does not operate after the detection of a motion event. The sensing cycle information is, however, not limited to the motion sensor and may be used for various sensors.

Referring to FIG. 6C, the communication apparatus may determine at step S670 whether a door closing event occurs. Using a door sensor equipped in a door, the communication apparatus may determine whether the door is closed.

If the door is closed, the communication apparatus may set a timer and a temporary sensing cycle value (mo_) to zero at step S671.

At step S672, the communication apparatus may trigger a timer.

At step S673, the communication apparatus may determine whether the motion sensor is in an idle state. If the door closing event occurs, the motion sensor detects a user's motion. Therefore, the communication apparatus may determine, as the sensing cycle information, the greatest value of times taken for the motion sensor to change from a sensing state to an idle state.

If the motion sensor is in an idle state, the communication apparatus may set the temporary sensing timer value (mo_) to a timer value at step S674. Also, the communication apparatus may set the maximum value of the temporary sensing cycles collected at step S674 to a sensing cycle.

By setting the sensing cycle as discussed above and also disallowing the sensor to detect a user's motion during the sensing cycle, the communication apparatus may increase the battery efficiency of the sensor.

Figure 7A:
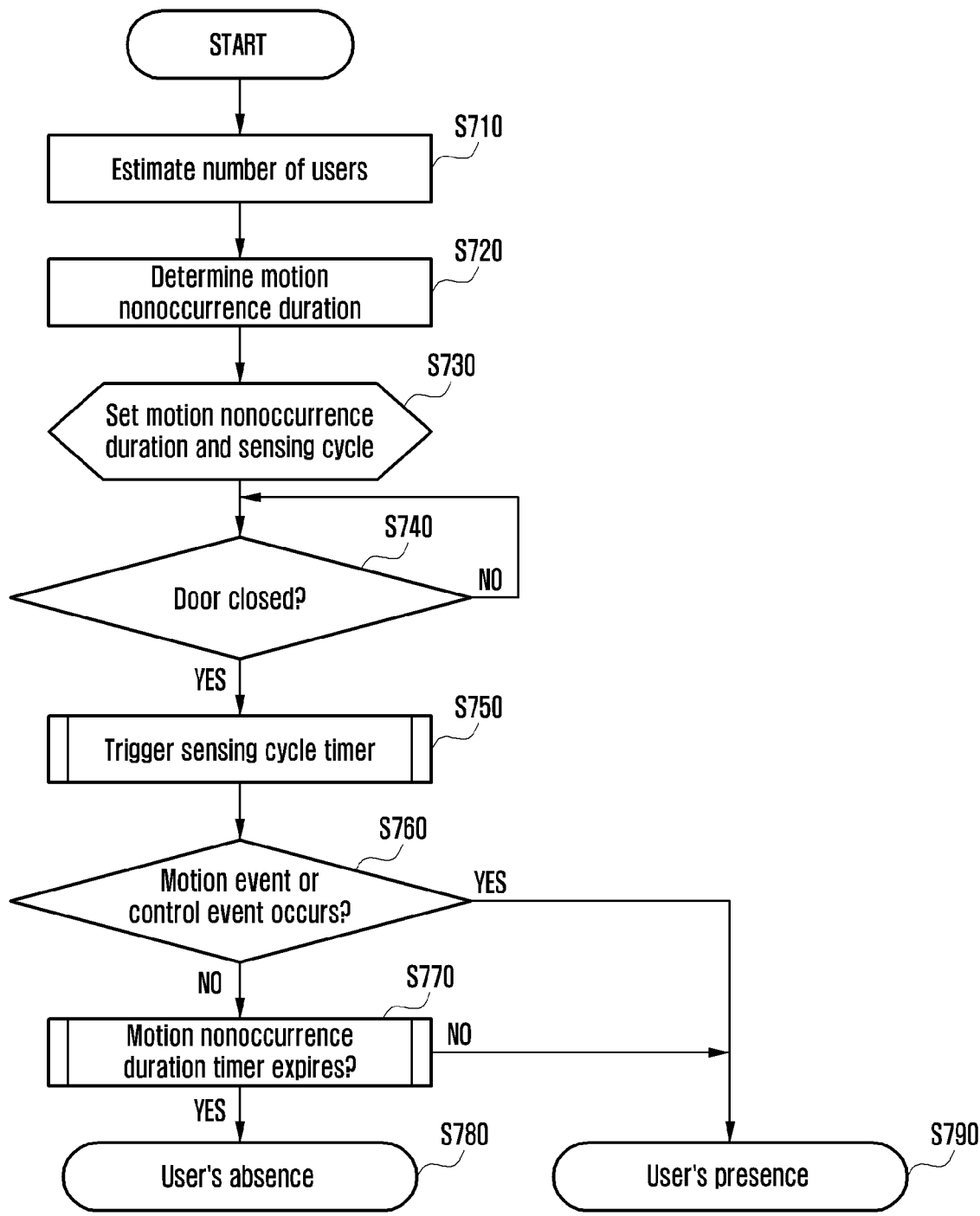
FIG. 7A is a flowchart illustrating an example process of determining a user's presence according to an example embodiment of the present disclosure.

Finally, the communication apparatus may store the set sensing cycle in the DB. FIG. 7A is a flowchart illustrating an example process of determining a user's presence according to an example embodiment of the present disclosure.

FIG. 7A corresponds to a case where a specific space is formed of a single section. Referring to FIG. 7A, the communication apparatus may estimate the number of users at step S710 and then determine motion nonoccurrence duration information at step S720.

Herein, the motion nonoccurrence duration information may be determined, based on the number of users located in a specific space. For example, since the number of occurrences of a motion event or control event is greater in case of small users than in case of many users, the communication apparatus may set the motion nonoccurrence duration to be relatively short. On the other hand, since the number of occurrences of a motion event or control event is smaller in case of many users than in case of small users, the communication apparatus may set the motion nonoccurrence duration relatively long.

As such, the communication apparatus may determine the motion nonoccurrence duration information by considering the number of users. Details of determining the number of users and the motion nonoccurrence duration information are similar to the above description in FIGS. 5 and 6, and thus the repetition will be avoided hereinafter.

Thereafter, the communication apparatus may set the motion nonoccurrence duration information and the sensing cycle at step S730 and then determine at step S740 whether the door is closed.

If the door is closed, the communication apparatus may trigger a sensing cycle timer at step S750. If the sensing cycle timer expires, the communication apparatus may determine at step S760 whether a motion event or control event occurs.

If any motion event or control event occurs, the communication apparatus may determine at step S790 that a user is present in a specific space.

On the other hand, if neither a motion event nor a control event occurs, the communication apparatus may determine at step S770 whether the motion nonoccurrence duration information timer expires.

If there is neither a motion event nor a control event until a motion nonoccurrence duration timer expires, the communication apparatus may determine at step S780 that a user is absent from a specific space.

A process of operating the sensing cycle timer at the step S750 and a process of operating the motion nonoccurrence duration timer at the step S770 will be described in greater detail below with reference to FIGS. 7B and 7C.

Figure 7B:
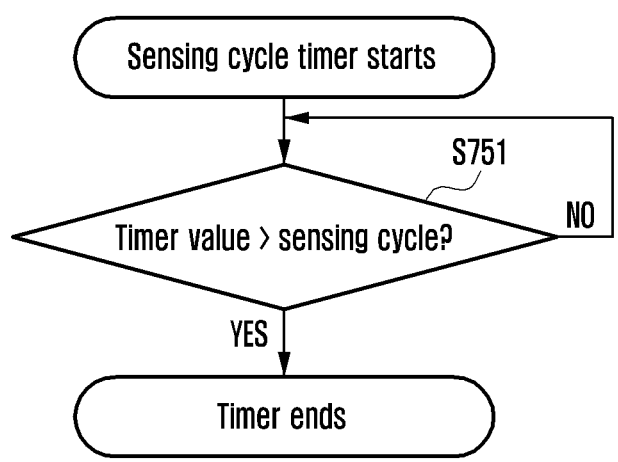
FIG. 7B is a flowchart illustrating an example process of operating a sensing cycle timer according to an example embodiment of the present disclosure.

FIG. 7B is a flowchart illustrating an example process of operating a sensing cycle timer according to an example embodiment of the present disclosure.

As discussed above, the sensing cycle may refer to an interval of time during which a sensor does not operate. Thus, the communication apparatus may trigger the sensing cycle timer after door closing, and determine at step S751 whether the timer value exceeds the sensing cycle.

If the timer value does not exceed the sensing cycle, this step may be performed again since the sensor does not operate. On the other hand, if the timer value exceeds the sensing cycle, the sensor may operate so that the communication apparatus may terminate the timer and then proceed to the next step.

Figure 7C:
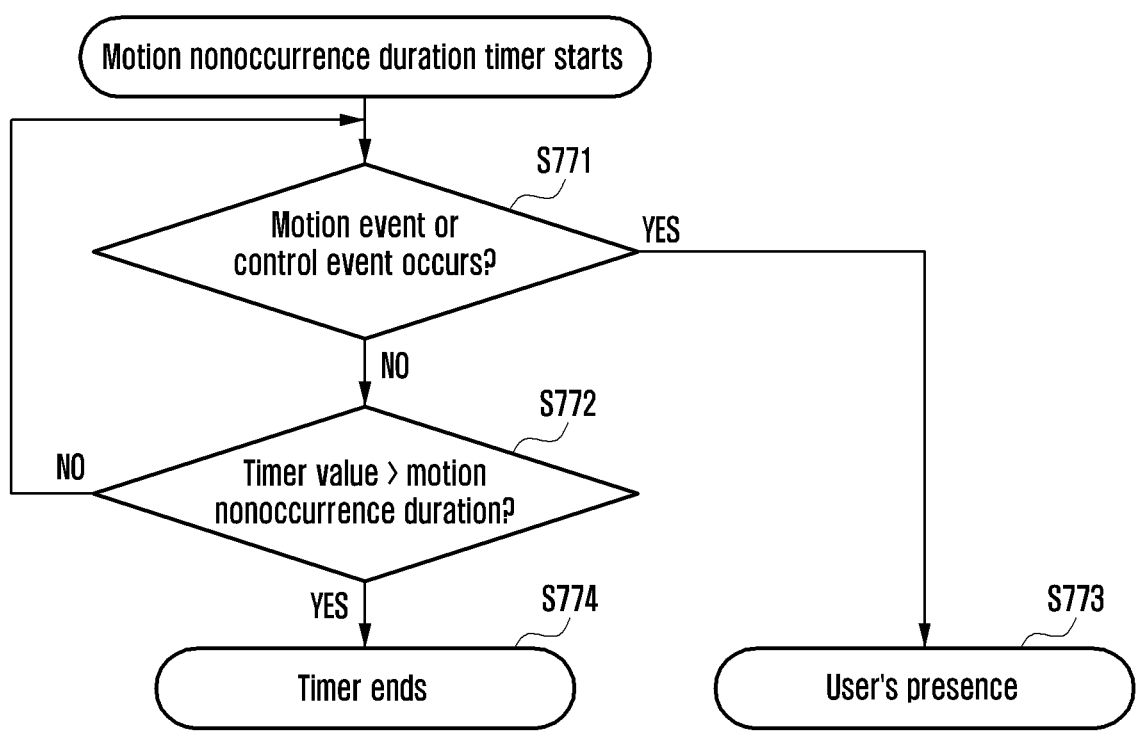
FIG. 7C is a flowchart illustrating an example process of operating a motion nonoccurrence duration according to an example embodiment of the present disclosure.

FIG. 7C is a flowchart illustrating an example process of operating a motion nonoccurrence duration according to an example embodiment of the present disclosure.

The communication apparatus may determine at step S771 whether a motion event or control event occurs.

If neither motion event nor control event occurs, the communication apparatus may determine at step S772 whether a timer value exceeds a given motion nonoccurrence duration. If the timer value does not exceed the given motion nonoccurrence duration, the communication apparatus may return to the step S771 and continue determining whether a motion event or control event occurs.

If any motion event or control event occurs before the timer value exceeds the motion nonoccurrence duration, the communication apparatus may determine at step S773 that a user is present in a specific space.

On the other hand, If there is no motion event or control event until the timer value exceeds the motion nonoccurrence duration, the communication apparatus may terminate the timer and determine at step S774 that a user is absent from a specific space.

Figure 8:
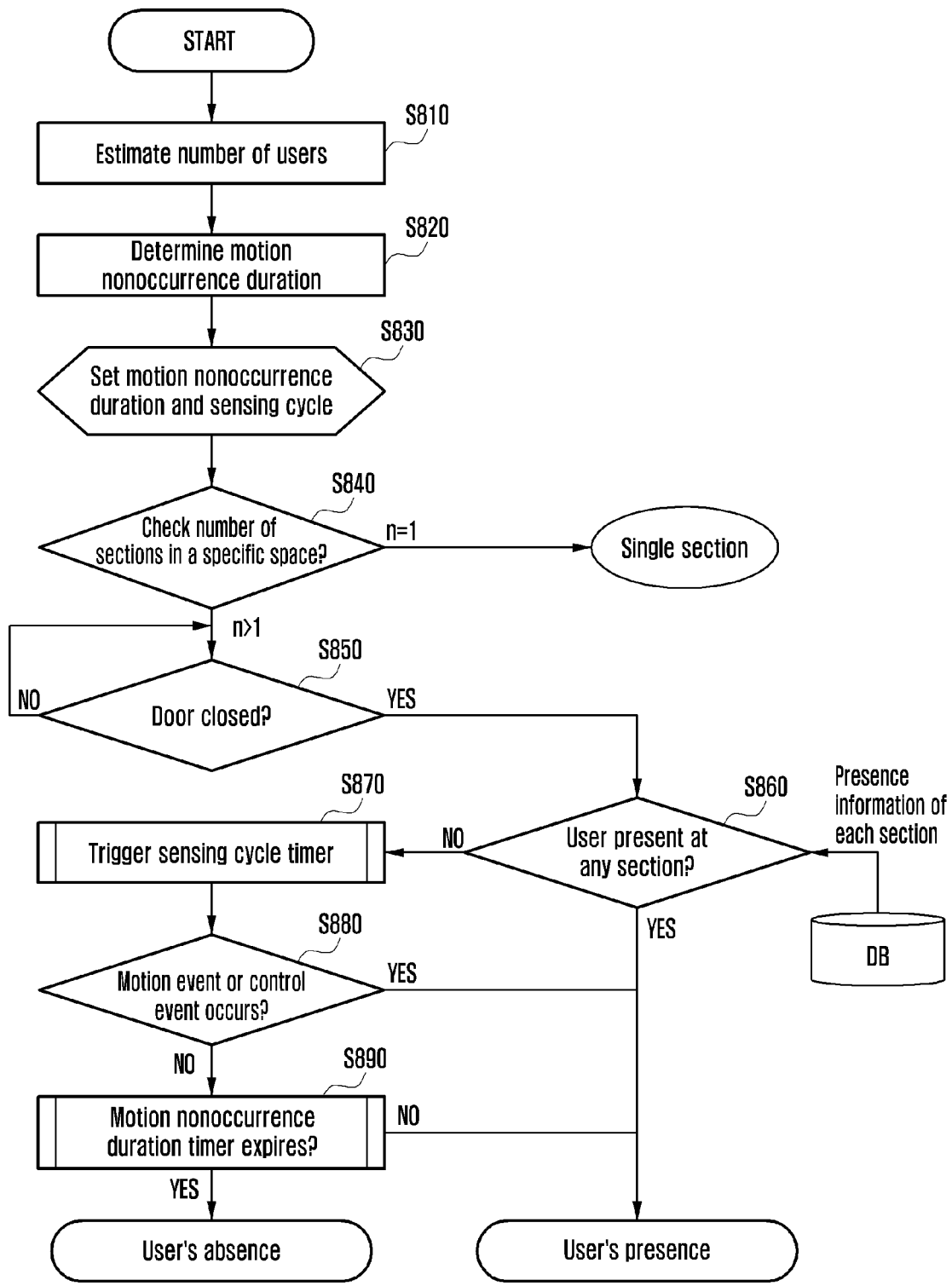
FIG. 8 is a flowchart illustrating an example process of determining a user's presence according to an example embodiment of the present disclosure.

FIG. 8 is a flowchart illustrating an example process of determining a user's presence according to an example embodiment of the present disclosure.

FIG. 8 corresponds to an example where a specific space is formed of a plurality of sections. Referring to FIG. 8, the communication apparatus may estimate the number of users at step S810 and then determine motion nonoccurrence duration information at step S820. These are similar to the above discussion in FIGS. 5 and 6, and thus a repeated detailed description will be omitted.

Thereafter, the communication apparatus may set a sensing cycle and motion nonoccurrence duration information at step S830 and then identify the number of sections contained in the specific space at step S840. If the number of sections contained in the specific space is one (n=1), the communication apparatus may determine a user's presence through, for example, the above-discussed FIG. 7A process.

On the other hand, if the number of sections contained in the specific space exceeds one section, the communication apparatus may determine at step S850 whether the door of a specific section is closed.

If the door of the specific section is closed, the communication apparatus may further determine at step S860 whether a user is present in any other section. By checking user presence information about each section stored in the DB, the communication apparatus may determine whether there is a section in which a user is present.

If there is a section in which a user is present, the communication apparatus may determine that a user is present in the specific space without a need to determine a user's presence in/from other sections. Therefore, if it is determined that there is any other section in which a user is present, the communication apparatus determines that a user is present in the specific space, and then ends the process.

If it is determined that there is no other section in which a user is present, the communication apparatus may trigger the sensing cycle timer at step S870 to determine whether a user is present in the specific section.

Thereafter, when the sensing cycle timer expires, the communication apparatus may determine at step S880 whether a motion event or control event occurs.

If any motion event or control event occurs, the communication apparatus may determine that a user is present.

If neither motion event nor control event occurs, the communication apparatus determines at step S890 whether a motion nonoccurrence duration timer expires.

If any motion event or control event does not occur until the motion nonoccurrence duration timer expires, the communication apparatus may determine that a user is absent.

Although the sensing cycle setting method is described in FIG. 6C, the communication apparatus may set the sensing cycle differently depending on situations. For example, since a user's state is easily changed when the door is opened, the communication apparatus may set the sensing cycle shortly so as to exactly determine whether a user enters the specific space.

On the other hand, when the door is closed, the communication apparatus may set the sensing cycle to be relatively long so as to reduce unnecessary energy consumption. The foregoing will be described in greater detail below with reference to FIG. 9.

Figure 9:
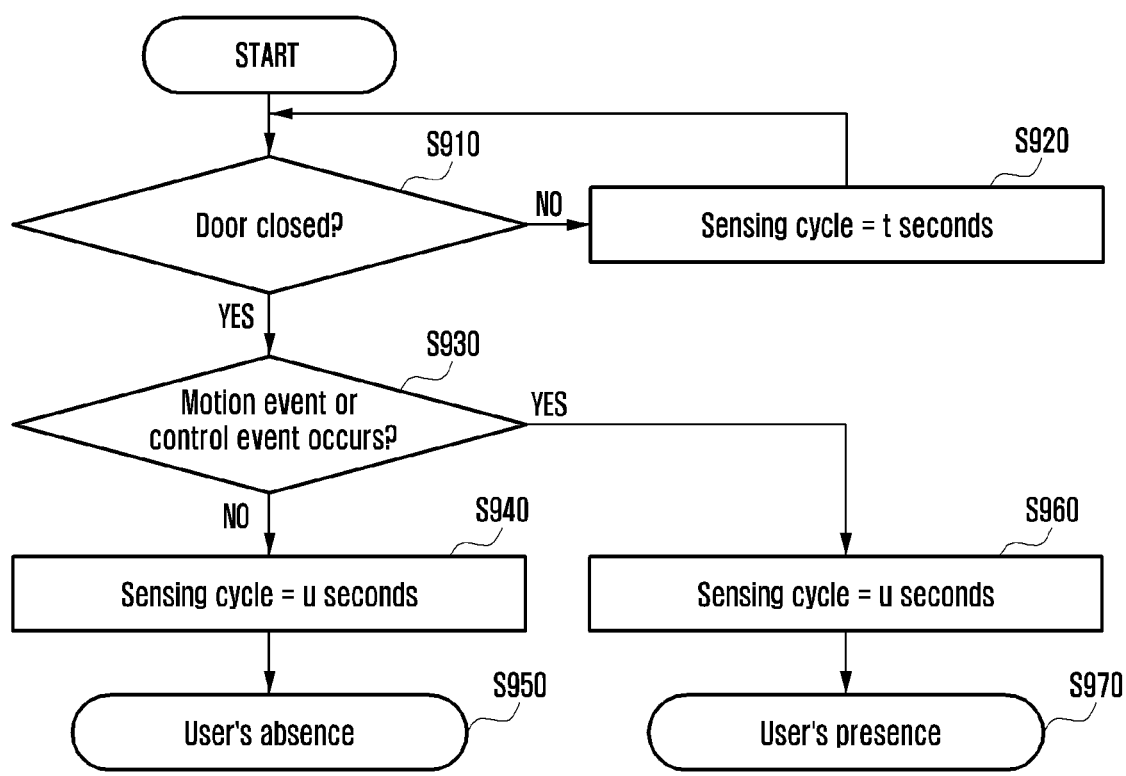
FIG. 9 is a flowchart illustrating an example process of determining a user's presence based on different sensing cycles determined depending on situations according to an example embodiment of the present disclosure.

FIG. 9 is a flowchart illustrating an example process of determining a user's presence based on different sensing cycles determined depending on situations according to an example embodiment of the present disclosure.

FIG. 9 corresponds to an example where a specific space is formed of a single section. Referring to FIG. 9, at step S910, the communication apparatus may determine whether the door is closed.

If it is determined that the door is opened, the communication apparatus may set at step S920 the sensing cycle to a smaller value (t seconds) than in case the door is closed. By setting a smaller sensing cycle, the communication apparatus may determine whether a user enters the specific space.

If it is determined that the door is closed, the communication apparatus may determine at step S930 whether a motion event or control event occurs.

If any motion event or control event does not occur, the communication apparatus may set at step S940 the sensing cycle to a greater value (u seconds) than in case the door is opened. By setting a greater sensing cycle, the communication apparatus may reduce unnecessary energy consumption.

Thereafter, if neither motion event nor control event occurs for a given time, the communication apparatus may determine at step S950 that a user is located in the specific space. Details are similar to the above description in FIGS. 7A and 8.

Meanwhile, even in case a motion event or control event occurs, the communication apparatus may set at step S960 the sensing cycle to a greater value (u seconds) than in case the door is opened. Then, at step S970, the communication apparatus may determine that a user is located in the specific space.

Figure 10:
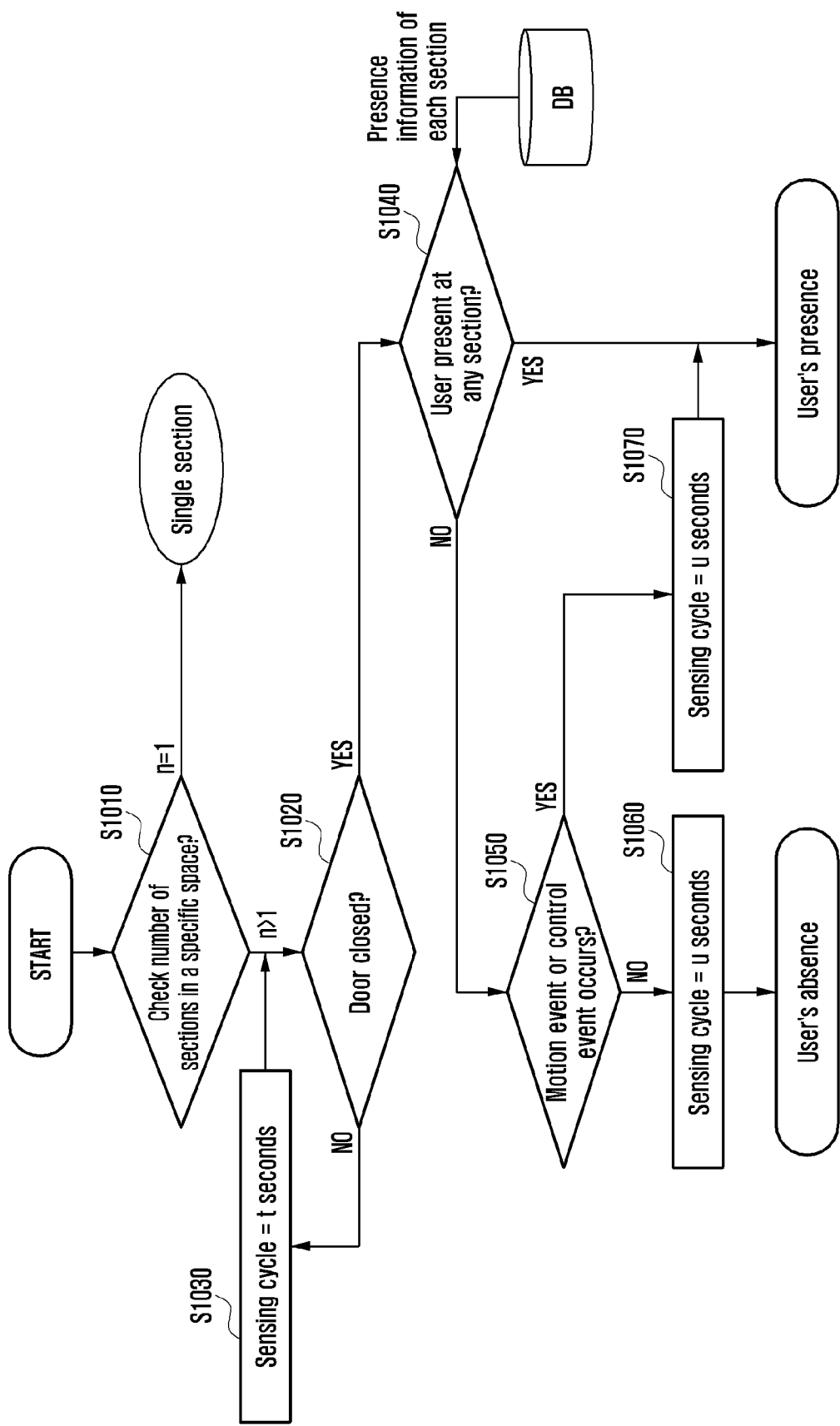
FIG. 10 is a flowchart illustrating another example process of determining a user's presence based on different sensing cycles determined depending on situations according to an example embodiment of the present disclosure.

FIG. 10 is a flowchart illustrating another example process of determining a user's presence based on different sensing cycles determined depending on situations according to an example embodiment of the present disclosure.

FIG. 10 corresponds to a case where a specific space is formed of a plurality of sections. Referring to FIG. 10, at step S1010, the communication apparatus may check the number of sections contained in the specific space.

If the specific space is formed of a single section, the communication apparatus may determine the sensing cycle and then determine a user's presence as previously discussed in FIG. 9.

However, if the number of sections contained in the specific space exceeds one section, the communication apparatus may determine at step S1020 whether the door of a specific section (hereinafter, section 1) is closed.

If the door of the section 1 is not closed, the communication apparatus may set at step S1030 the sensing cycle to be relatively shorter (t seconds) than in case the door is opened, and then check whether a user enters the specific space.

If the door of the section 1 is closed, the communication apparatus may further determine at step S1040 whether there is any other section in which a user is located. By checking user presence information about each section stored in the DB, the communication apparatus may determine whether there is a section in which a user is located.

If there is any section in which a user is located, the communication apparatus may determine that a user is present in the specific space without further determining whether a user is located in any other section. Therefore, if it is determined that there is a section in which a user is located, the communication apparatus determines user's presence and then end the process.

If it is determined that there is no other section in which a user is located, the communication apparatus may determine at step S1050 whether a motion event or control event occurs so as to determine a user's presence in the specific section.

If any motion event or control event does not occur, the communication apparatus may set at step S1060 the sensing cycle to be relatively longer (u seconds) than in case the door is opened. Also, if neither motion event nor control event occurs for a given time, the communication apparatus may determine that a user is not located in the specific space.

If any motion event or control event occurs, the communication apparatus may set at step S1070 the sensing cycle to be relatively longer (u seconds) than in case the door is closed, and then determine that a user is present.

Meanwhile, if a user stays long in the same place and if no user's motion is detected for a certain time, the communication apparatus may determine that a user is not located in the specific space. Therefore, the communication apparatus may determine a user's presence, based on variations in sensor status along user's travel path. This will be described in greater detail below with reference to FIG. 11.

Figure 11:
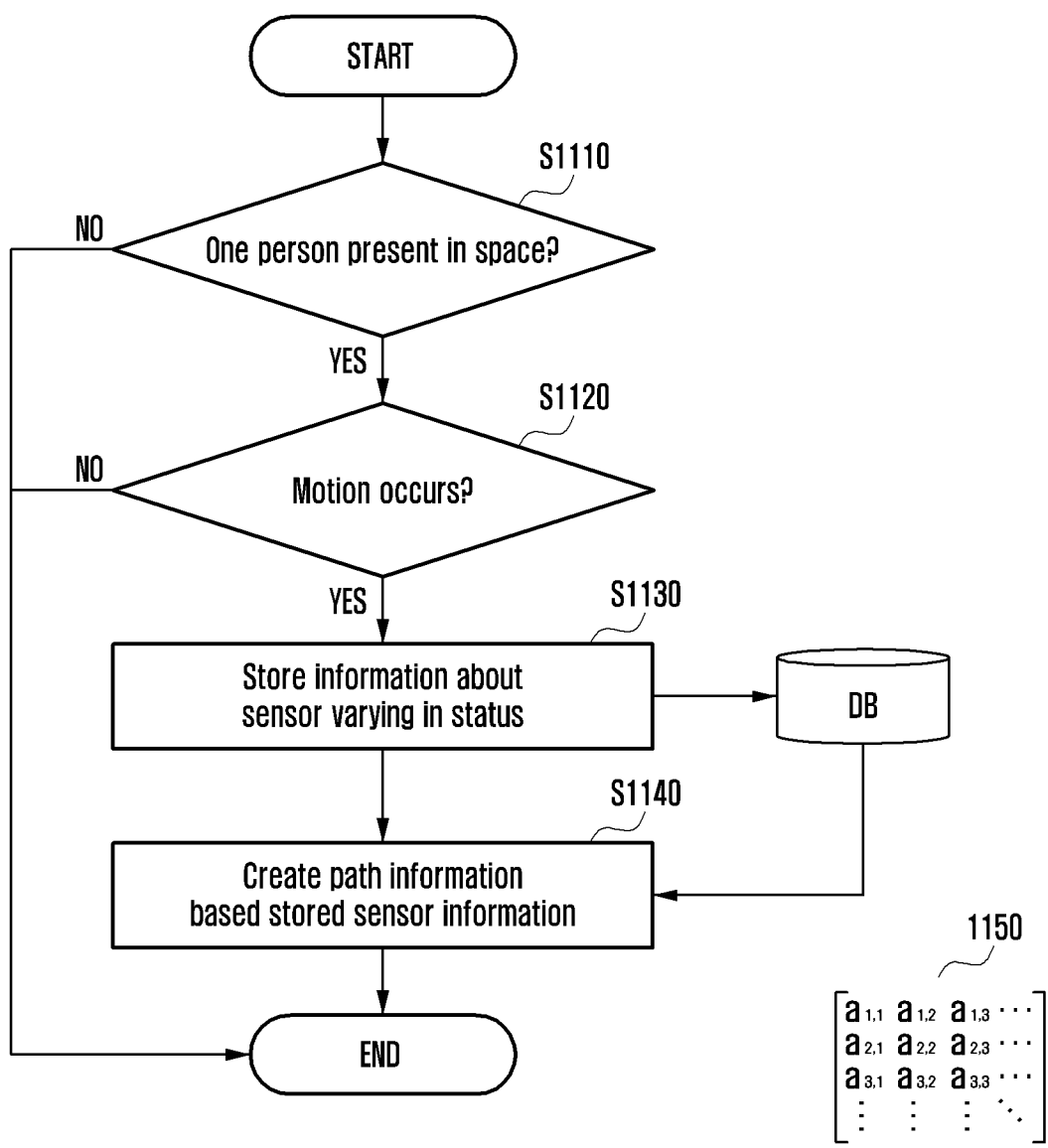
FIG. 11 is a flowchart illustrating an example process of creating path information based on variations in sensor status according to an example embodiment of the present disclosure.

FIG. 11 is a flowchart illustrating an example process of creating path information based on variations in sensor status according to an example embodiment of the present disclosure.

The path information may refer to information associated with adjacent section determined on the basis of variations in sensor status along user's travel path. For example, if there is a room 1 between a living room and a room 2, a user cannot move from the room 2 to the living room without passing through a sensor contained in the room 1. Therefore, using sensor status variations (motion detection at the living room sensor->motion detection at the room 1 sensor->motion detection at the room 2 sensor) caused when a user moves from the living room to the room 2, the communication apparatus may create path information indicating that the living room and the room 1 are connected and the room 1 and the room 2 are connected.

Referring to FIG. 11, the communication apparatus determines at step S1110 whether one user is located in a specific space. If there are two or more users, variations in sensor status may occur several times and thus the communication apparatus may fail to create exact path information. Therefore, unless one user is located in the specific space, the communication apparatus may end this process.

If there is one user in the space, the communication apparatus may determine at step S1120 whether a user's motion occurs in one section in a situation where all sensors do not operate.

If any user's motion occurs, the communication apparatus may store, in the DB at step S1130, information about a sensor that varies in status occur until there is no variation in status of the sensors installed in the space.

For example, if a front door sensor, a living room sensor, a bathroom sensor, the living room sensor, a room 1 sensor, a room 2 sensor, a veranda sensor, the room 2 sensor, and the room 1 sensor sequentially operate based on a user's movement, the communication apparatus may store sensor information in the order of operation.

At step S1140, the communication apparatus may create path information using the stored sensor information. Alternatively, without storing sensor information in the DB, the communication apparatus may create path information. The created path information may be arranged in a matrix 1150.

For example, when the respective sensors operate as mentioned above according to a user's movement, the communication apparatus may recognize that a front door and a living room, the living room and a bathroom, the living room and a room 1, the room 1 and a room 2, and the room 2 and a veranda are connected respectively, and that the front door and the bathroom, the front door and the room 1, and the bathroom and the room 1 are not connected respectively. Therefore, the communication apparatus may create path information by denoting the connected sections by 1 and the disconnected sections by 0 in matrix. This method for creating the path information is, however, merely an example only and not to be construed as a limitation.

Using the created path information, the communication apparatus may determine a user's presence. This will be described in greater detail below with reference to FIG. 12.

Figure 12:
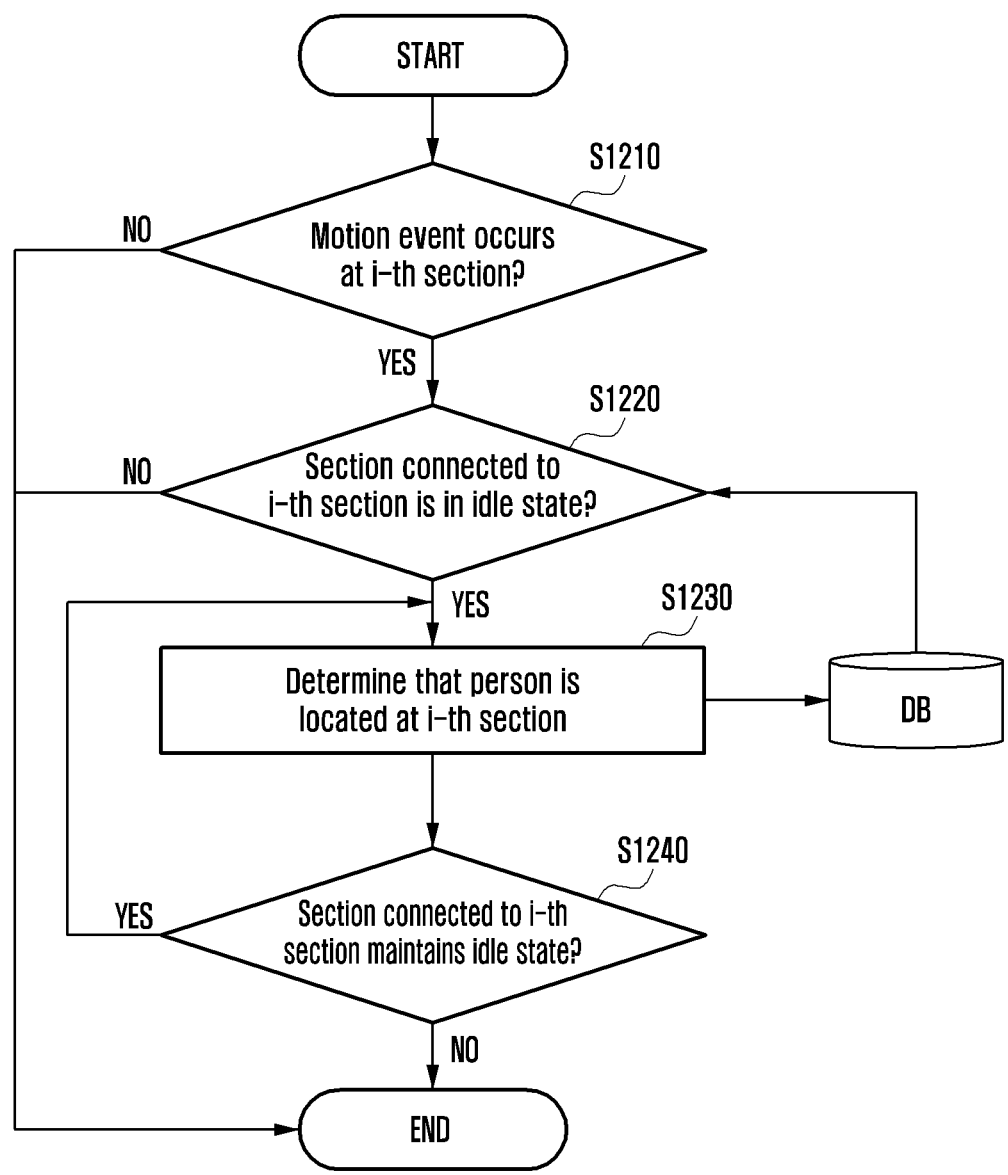
FIG. 12 is a flowchart illustrating an example process of determining a user's presence based on path information according to an example embodiment of the present disclosure.

FIG. 12 is a flowchart illustrating an example process of determining a user's presence based on path information according to an example embodiment of the present disclosure.

Referring to FIG. 12, at step S1210, the communication apparatus may determine whether a motion event occurs at the i-th section.

If any motion event occurs at the i-th section, the communication apparatus may identify a section connected to the i-th section, based on the path information, and determine at step S1220 whether a motion event or control event occurs at the identified section.

If any motion event or control event does not occur (also referred to as an idle state) at the section connected to the i-th section, the communication apparatus may determine that a user is located in the i-th section, and then store this information in the DB at step S1230.

Since a user can't help passing through any other section connected to the i-th section, the communication apparatus may check whether the connected section is in an idle state, and then determine a user's presence.

Thereafter, at step S1240, the communication apparatus determines whether other section connected to the i-th section maintains an idle state. If a motion event or control event occurs in other section, the communication apparatus may determine that a user moves, and end this process.

If other section connected to the i-th section maintains an idle state, the communication apparatus may return to the step S1230, determine that a user is located at the i-th section, and store this in the DB.

For example, if the motion sensor located in the room 1 detects a motion event, the communication apparatus determines the states of the living room and room 2 which are connected to the room 1. If each of these states is an idle state, namely, if any motion event or control event does not occur in the living room and the room 2, the communication apparatus stores user's location as the room 1 and continuously checks the states of the living room and room 2. If the states of the living room and room 2 maintain an idle state, the communication apparatus may determine that a user is present in the room 1 even though no user's motion is detected from the room 1 for a while.

Through this process, the communication apparatus may determine user's presence location and then control the electronic devices even though there is no user's motion for a given time.

Figure 13:
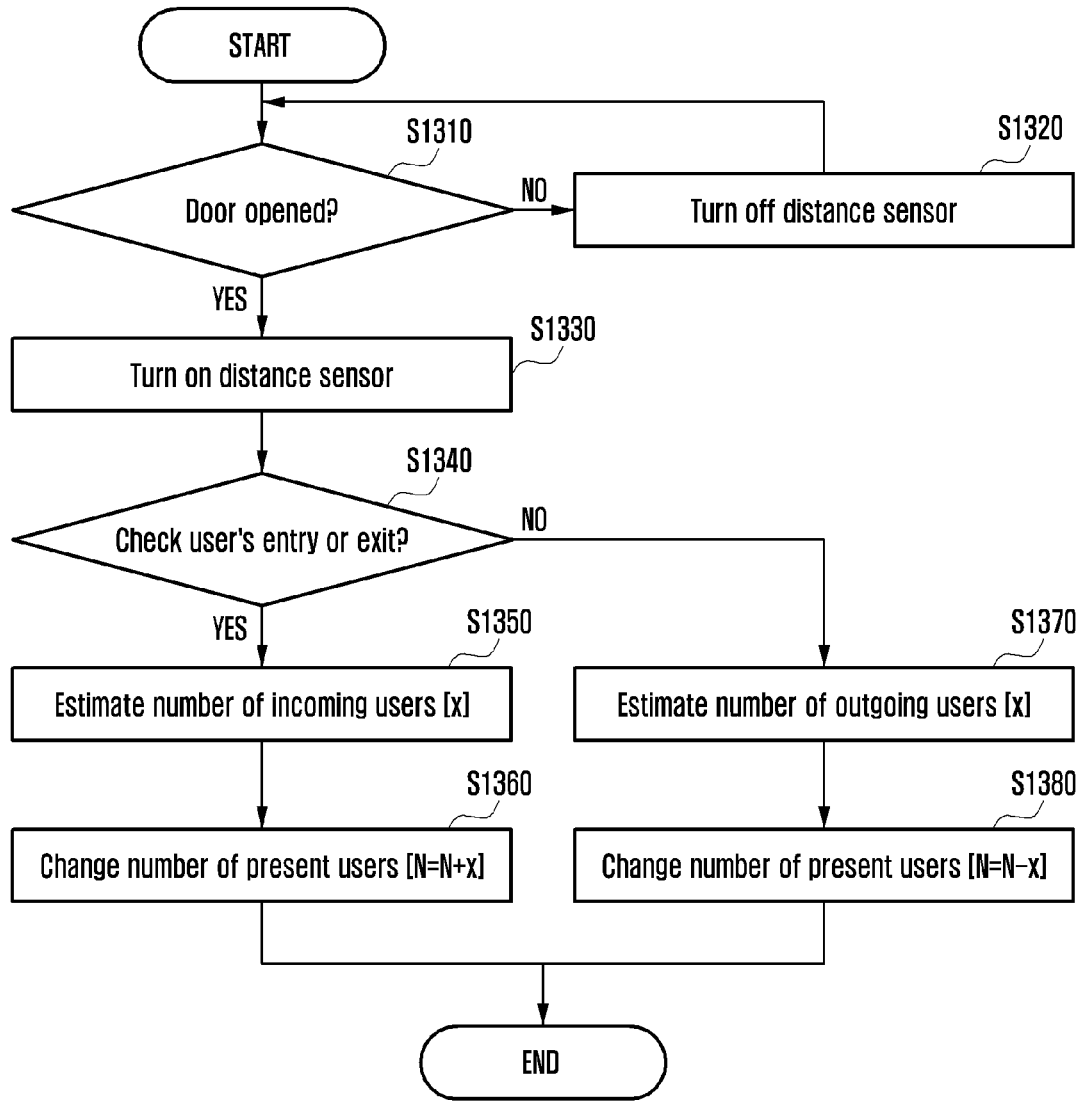
FIG. 13 is a flowchart illustrating an example process of determining a user's presence using a distance sensor according to another example embodiment of the present disclosure.
Figure 13:
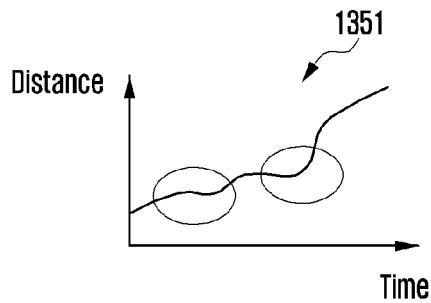
Figure 13:
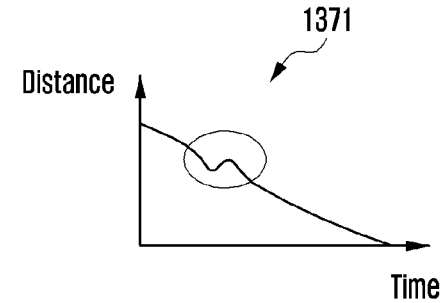

FIG. 13 is a flowchart illustrating an example process of determining a user's presence using a distance sensor according to another example embodiment of the present disclosure.

Referring to FIG. 13, at step S1310, the communication apparatus may determine whether the door is opened.

If the door is closed, the communication apparatus may turn off a distance sensor at step S1320. If the door is opened, the communication apparatus may turn on the distance sensor at step S1330.

For example, the distance sensor may be set to operate when the door is opened, or the communication apparatus may trigger the distance sensor when the door is opened.

This is, however, merely an example. Alternatively, the distance sensor may periodically operate and then measure a distance from a user. If the measured distance is within a given value, the sensor may continue to measure such a distance.

The distance sensor may be equipped in the door. Therefore, using a distance between a user and the door, measured by the distance sensor, the communication apparatus may determine a user's entry. In this disclosure, such determination regarding a user's entry may refer, for example, to determining whether a user enters a specific space or goes out of the specific space. Considering a case of simultaneous entry or exit of several users, there may be several distance sensors. Namely, since two or more users enter the specific space or go out of the specific space, two or more distance sensors may be used.

For example, at step S1340, the communication apparatus that turns on the distance sensor may determine a user's entry using the distance information measured by the distance sensor.

The communication apparatus may determine a user's entry using variations in distance information. For example, if the distance sensor is located to face the inside of the door at the outside of the door, the communication apparatus may determine that a user exits the specific space when the distance information variation measured by the distance sensor is smaller than zero. If the distance information variation is greater than zero, the communication apparatus may determine that a user enters the specific space. For example, the communication apparatus may determine information about a user's state, based on direction information of the distance sensor as well as variations in distance information.

Alternatively, the distance sensor may create the distance information having different signs according to a user's location. Using this, communication apparatus may determine a user's entry. For example, based on the direction to which a user's location is detected, the distance sensor may create the distance information having different signs. For example, when the distance sensor is located to face the inside of the door at the outside of the door, the distance sensor may sense a distance of a user located outside the door and then create a minus sensing value, and similarly sense a distance of a user located inside the door and then create a plus sensing value.

Therefore, if a variation in distance between the user and the distance sensor is a negative number when the distance sensor measures the distance after door opening, the communication apparatus may determine that a user exits the specific space. On the other hand, if the above variation is a positive number, the communication apparatus may determine that a user enters the specific space.

If it is determined that a user enters the space, the communication apparatus may estimate at step S1350 the number of users, who enter the space, using the distance information received from the distance sensor.

For example, the communication apparatus may estimate the number of users by identifying the number of inflection points on a distance information graph. In this case, the inflection point may refer to a point at which the slope of graph changes from a minus sign to a plus sign and vice versa.

For example, a graph 1351 is a distance information graph in which a variation in distance information is greater than zero. Referring to the graph 1351, there are two inflection points. Thus, the communication apparatus may estimate that the number of users who enter the space is three.

Meanwhile, in case the sign of distance information is sensed differently depending on a user's location, the communication apparatus may estimate the number of users using the inflection points on the distance information graph.

Using the estimated number of users, the communication apparatus may change at step S1360 the number of users who are present in the space. For example, the communication apparatus may change the number of users by adding the estimated number of users (x) to the stored number of users who are present in the space (N), and then store this in the DB.

If it is determined that a user exits the space, the communication apparatus may estimate at step S1370 the number of users who exit the space using the distance information received from the distance sensor.

As discussed above, the communication apparatus may estimate the number of users by identifying the number of inflection points on the distance information graph.

For example, another graph 1371 is a distance information graph in which a variation in distance information is smaller than zero. Referring to the graph 1371, there is one inflection point. Thus, the communication apparatus may estimate that the number of users exiting the space is one. Meanwhile, in case the sign of distance information is sensed differently, the communication apparatus may estimate the number of users using inflection points on the distance information graph.

Using the estimated number of users, the communication apparatus may change at step S1380 the number of users who are present in the space. For example, the communication apparatus may change the number of users by subtracting the estimated number of users (x) from the stored number of users who are present in the space (N), and then store this in the DB. In this case, if the estimated number of users (x) who exit the space is the same as the stored number of users (N) who are present in the space, the communication apparatus may determine user's absence and thereby control the electronic devices.

Figure 14:
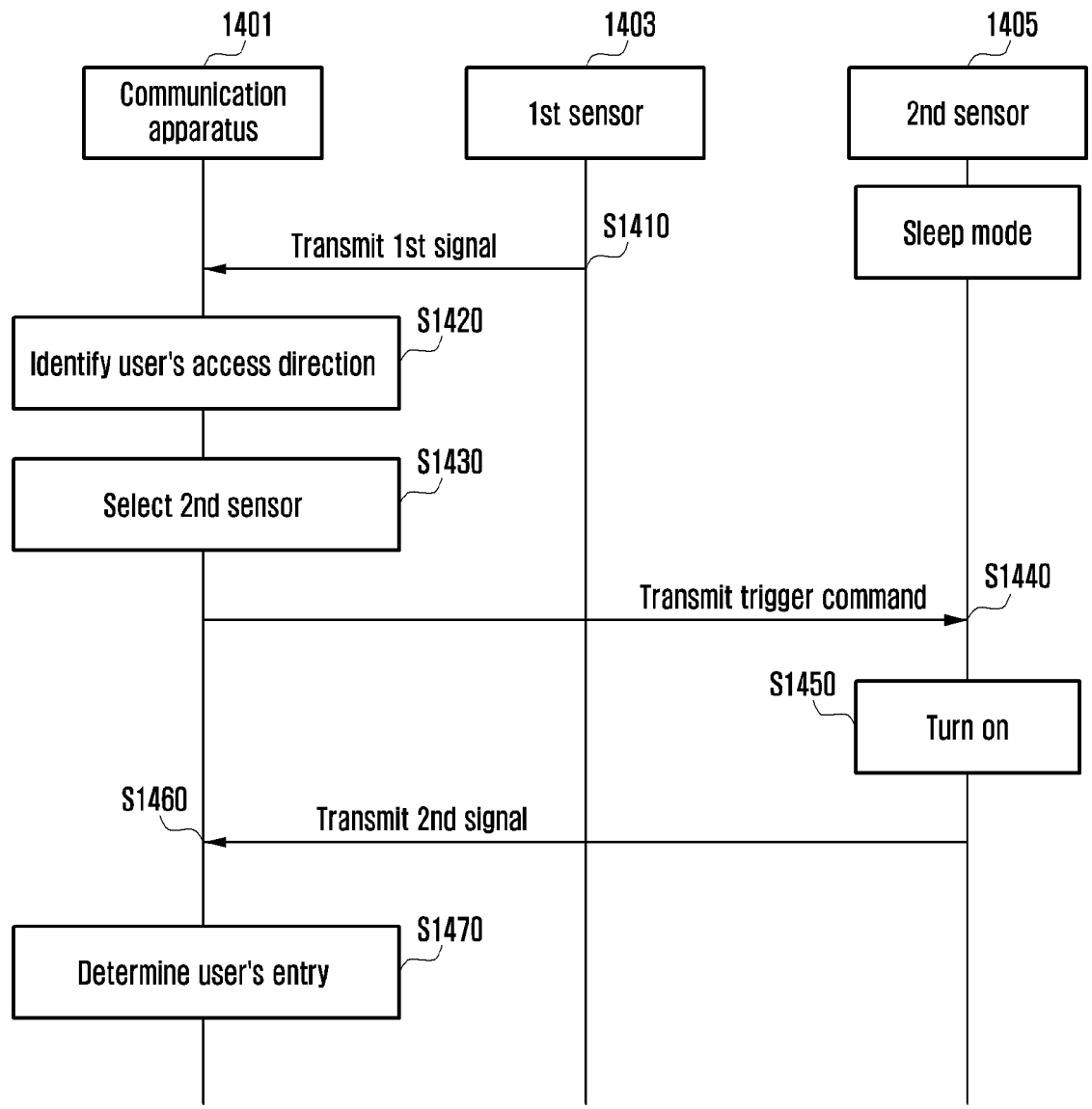
FIG. 14 is a sequence diagram illustrating an example process of determining a user's entry according to still another example embodiment of the present disclosure

FIG. 14 is a sequence diagram illustrating an example process of determining a user's entry according to still another example embodiment of the present disclosure.

Referring to FIG. 14, the communication apparatus 1401 may refer to a device for determining a user's entry and thereby controlling electronic devices located in a specific space. The configuration of the communication apparatus 1401 will be described in greater detail below with reference to FIGS. 16 and 17.

The communication apparatus 1401 may include a gateway. Also, the communication apparatus 1401 may be contained in the form of gateway within any electronic device such as a TV. Alternatively, the communication apparatus may be located separately in the specific space.

The first sensor 1403 may refer to a sensor used for determining a user's access direction. For example, the first sensor 1403 may be attached to the door and transmit information for determining the user's access direction by detecting a user's touch.

The second sensor 1405 may refer to a sensor used for determining a user's entry. For example, the second sensor 1405 may be located in the inside or outside of the specific space and transmit information for determining a user's entry by detecting a user's motion after the detection of user's touch by the first sensor 1403.

Although it is described that the first sensor is a touch sensor equipped in the door and also the second sensor is a motion sensor located in the specific space, this is merely an example and not to be construed as a limitation. For example, the first sensor may include a contact sensor, a distance sensor, a proximity sensor, or the like which is contained in the door or located around the door. The second sensor may include a motion sensor, a camera, a sound sensor, a distance sensor, or the like.

Referring to FIG. 14, when a user's touch is detected, the first sensor may transmit a first signal created by the user's touch to the communication apparatus at step S1420. Also, the first sensor may store such sensing information in a memory unit.

The communication apparatus that receives the first signal may determine a user's access direction using the received first signal at step S1420.

For example, the communication apparatus may identify the location of the first sensor using the received first signal. For example, the communication apparatus may determine the sensor location using a sensor identifier contained in the first signal. The sensor identifier may include at least one of a device identifier, an internet protocol (IP) address, and a media access control (MAC) address. Therefore, the communication apparatus may determine the location of a sensor using such a sensor identifier. The communication apparatus may store sensor location information as shown in Table 1. Since the sensor location information is used for determining a user's access direction, this term may be also referred to as access direction sensor information.

TABLE 1

| First sensor | MAC address | Whether to receive | Access direction |
|---|---|---|---|
| Contact sensor 1 (Outside knob of door) | 00:12:34:56:78:9A | X | — |
| Contact sensor 2 (Inside knob of door) | AB:08:1B:50:AB:06 | ◯ | Indoor -> Outdoor |
| Proximity sensor 1 (Outside door plane) | 6B:00:AB:03:AB:08 | X | — |
| Proximity sensor 2 (Inside door plane) | A5:01:AD:01:AB:90 | X | — |

Therefore, the communication apparatus may determine the sensor location, based on the MAC address contained in the first signal. For example, if the MAC address contained in the first signal is AB:08:1B:50:AB:06, the communication apparatus may identify that the first sensor is a contact sensor 2 and a sensor attached to the inside knob of the door. Therefore, since the first sensor is located indoor, the communication apparatus may determine that a user goes out of the specific space.

Also, the first signal may contain information sensed by the first sensor. For example, the first signal may contain information associated with contact detection. In addition, the first sensor may perform sensing periodically or in response to a command of the communication apparatus. Therefore, when there is a change in sensing information, or if there is a request for sensing information from the communication apparatus, the first sensor may transmit the sensing information.

The communication apparatus that identifies the user access direction may select the second sensor for determining a user's entry at step S1430. The communication apparatus may select a sensor located inside or outside the specific space depending on the user access direction and then control the selected sensor to transmit the sensing information.

For example, the communication apparatus may include a list of sensors selectable depending on user access direction as shown in Table 2.

TABLE 2

| Access direction | Second sensor | Whether to receive | Access direction |
|---|---|---|---|
| Indoor -> Outdoor | Motion sensor 1 (Front of outside door of room) | ◯ | Exit |
| | Motion sensor 2 (Front of door of adjacent room) | X | — |
| | Hallway CCTV (Ceiling of hallway end) | X | — |
| Outdoor -> Indoor | Room motion sensor 1 (Front of inside door of room) | X | — |
| | Room motion sensor 2 (Ceiling of bedroom entrance) | X | — |

When a user moves from the inside of a specific space (e.g., a room) to the outside, namely, if the first sensor is located inside the specific space, the communication apparatus may select, as the second sensor, at least one of sensors located outside the specific space (e.g., a hallway, an elevator, a lobby, etc.). For example, the communication apparatus may select, as the second sensor, at least one of a motion sensor 1 located in front of the outside door of the specific space, a motion sensor 2 located in front of the door of an adjacent space, and a CCTV located in a hallway. If a user goes out of the specific space, the communication apparatus may be located outside the specific space and select, as the second sensor, one of sensors located on user's travel path.

Additionally, when a user moves from the outside of the specific space to the inside, namely, if the first sensor is located outside the specific space, the communication apparatus may select, as the second sensor, one of sensors located inside the specific space (e.g., around the front door, a bedroom, a bathroom, or the like). For example, the communication apparatus may select, as the second sensor, one of a motion sensor 1 located in front of the inside door of the specific space and a motion sensor 2 located on the ceiling of a bedroom entrance. If a user enters the specific space, the communication apparatus may be located inside the specific space and may select, as the second sensor, one of sensors located on user's travel path.

For example, when a user goes out of the specific space, the communication apparatus may select, as the second sensor, a motion sensor located in front of the outside door of the specific space and then, if a user's motion is sensed at the motion sensor, determine that a user exits the specific space.

The second sensor may be always activated and perform sensing. Alternatively, the second sensor may periodically perform sensing. Alternatively, for efficient use of a battery of power, the second sensor may keep a sleep mode state until the sensor is selected by the communication apparatus. The sleep mode state may refer to a state in which the sensor does not perform sensing. Namely, the sensor may operate only when a user is located in the specific space. Therefore, if the selected second sensor is in a sleep mode, the communication apparatus that selects the second sensor may transmit a trigger command to the selected second sensor so as to change the state of the second sensor to a turn-on state at step S1440.

The second sensor that receives the trigger command may change the sleep mode to the turn-on state at step S1450 and start sensing. If a user's motion is detected, the second sensor may transmit, to the communication apparatus, at step S1460 the second signal that contains information indicating that a user's motion is detected. Additionally, the second sensor may transmit the second signal to the communication apparatus periodically or when a particular event occurs. Meanwhile, if the second sensor fails to detect a user's motion for a specific time, the second sensor may transmit, to the communication apparatus, the second signal that contains information indicating that a user's motion is not detected. Also, the second sensor may store the sensing information in the memory unit.

The second signal may contain a sensor identifier. The sensor identifier may include at least one of a device identifier, an IP address, and a MAC address. Also, the second signal may have a value sensed by a sensor. For example, the second signal may have information about whether a motion is detected, camera shooting data, or the like.

At step S1470, the communication apparatus that receives the second signal may determine a user's entry using the received second signal.

A reason for using both the first sensor and the second sensor is that it is difficult to exactly or precisely sense whether a user enters or exits the specific space even after the user access direction is determined using the first sensor. For example, even though the door inside sensor detects a user, who opens the door, and thereby the user access direction is determined as an outward direction, a user may close the door again. In this case, the user does not go out of the space. Therefore, the communication apparatus may use the second sensor located at the outside of the door so as to check whether the user goes out of the space.

Meanwhile, the communication apparatus may receive the third signal associated with a degree of door opening, created by the third sensor, and then determine a user's entry using the third signal.

The third sensor may refer to a sensor for determining a degree of door opening. A degree of door opening may include information associated with an angle at which the door is opened. Also, the third sensor may be always activated to perform sensing, or periodically perform sensing. Alternatively, the third sensor may be activated in response to a trigger command of the communication apparatus. The third sensor may transmit sensing information to the communication apparatus when there is a change in the sensing information, and in response to a request for the sensing information from the communication apparatus. Also, the third sensor may store the sensing information in the memory unit.

The third sensor may be equipped in the door or located around the door. For example, the third sensor may have a door sensor for checking a degree of door opening, and the door sensor may include two contact sensors attached to the door. Therefore, two contact sensors may operate as a transmitting unit and a receiving unit, respectively, thus measuring signal strength and determining a degree of door opening depending on the signal strength.

If a degree of door opening is less than threshold, the communication apparatus may determine that a user's entry does not occur. Details will be described below.

Figure 15:
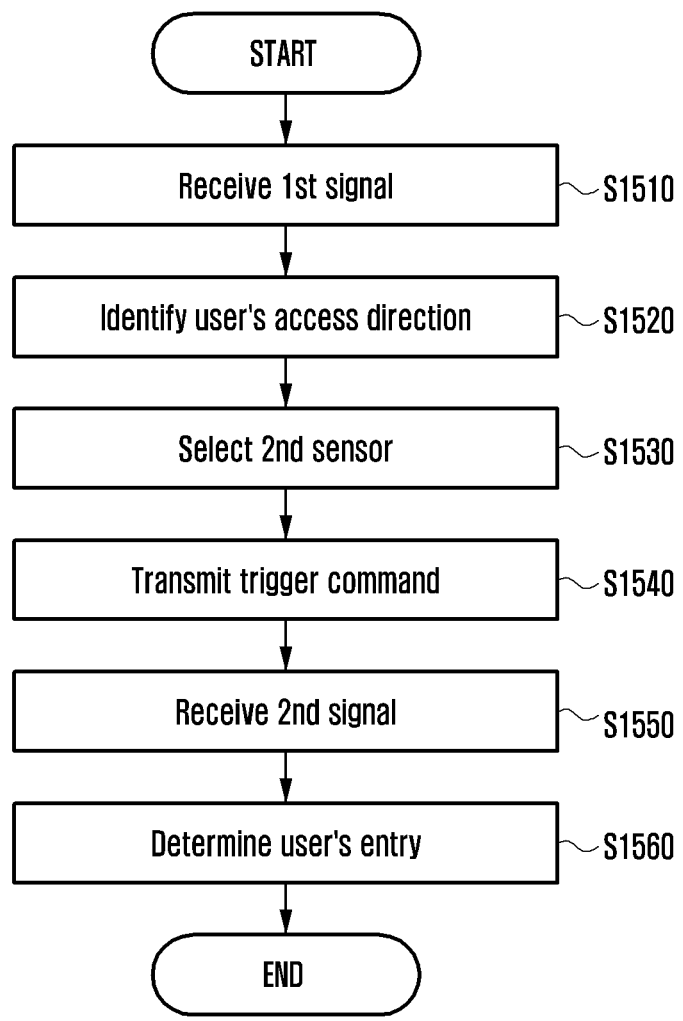
FIG. 15 is a flowchart illustrating an example process of determining a user's entry by a communication apparatus according to still another example embodiment of the present disclosure.

FIG. 15 is a flowchart illustrating an example process of determining a user's entry by a communication apparatus according to still another example embodiment of the present disclosure.

Referring to FIG. 15, if a user's touch is detected by the first sensor, the communication apparatus may receive the first signal from the first sensor at step S1510. At this time, the first signal may contain sensing information detected by the first sensor.

After receiving the first signal, the communication apparatus may identify a user access direction using the first signal at step S1520.

The communication apparatus may determine the location of the first sensor using the MAC address of the first sensor contained in the first signal and, based on the location, identify the user access direction. For example, if the first sensor is located inside the specific space, the communication apparatus may determine that a user exits the specific space. On the other hand, if the first sensor is located outside the specific space, the communication apparatus may determine that a user enters the specific space.

After identifying the user access direction, the communication apparatus may select at step S1530 the second sensor for determining a user's entry. For example, if it is determined that a user exits the specific space, the communication apparatus may select, as a second sensor, one sensor located on user' travel path from among sensors located outside the specific space. If it is determined that a user enters the specific space, the communication apparatus may select, as a second sensor, one sensor located on user's path from among sensors located inside the specific space.

After selecting the second sensor, the communication apparatus may transmit a trigger command to the second sensor at step S1540. The second sensor that receives the trigger command may change the sensor state to the turn-on state.

After triggering the second sensor, the communication apparatus may receive the second signal from the second sensor at step S1550. Also, the communication apparatus may determine a user's entry using the second signal at step S1560.

The second signal may contain information associated with a user's motion sensed by the second sensor.

For example, suppose that the communication apparatus selects, as the second sensor, one sensor located outside the specific space and then triggers the selected sensor. If the second sensor detects a user's motion, the second sensor creates the second signal indicating the occurrence of a user's motion, and the communication apparatus may receive the second signal from the second signal. Therefore, using the second signal, the communication apparatus may determine that a user exits the specific space.

If the second sensor fails to detect a user's motion for a given time, the second sensor may create the second signal indicating the nonoccurrence of a user's motion. The communication apparatus may receive the second signal and thereby determine that a user does not exit the specific space.

At step S1560, the communication apparatus may use the above-discussed FIG. 3 method so as to determine a user's entry through the second signal.

For example, the communication apparatus may estimate the number of users located in the specific space and, based on the estimated number of users, determine motion non-occurrence duration information. The method for estimating the number of users and the process of determining the motion nonoccurrence duration information are the same as or similar to that discussed previously in FIG. 3.

If the second signal received within the motion nonoccurrence duration does not contain information associated with a user's motion, the communication apparatus may determine that a user's entry does not occur. Therefore, the communication apparatus may not change the number of users who are present in the specific space. On the other hand, if the second signal received within the motion nonoccurrence duration includes information associated with a user's motion, the communication apparatus may determine that a user's entry occurs. If the received second signal contains information associated with a user's motion, the communication apparatus may determine a user's presence depending on the user access direction.

For example, when a user exits the specific space, the communication apparatus may reduce the number of users who are present in the specific space. In this case, the distance sensor may be used for identifying the number of users who exit the specific space, and details are the same as discussed above.

If a user enters the specific space, the communication apparatus may increase the number of users who are present in the specific space. In this case, the distance sensor may be also used for identifying the number of users.

If the second sensor fails to detect a user's motion, the sensor may not transmit the second signal. In such a case, the communication apparatus may determine a user's entry by determining whether the second signal is received within the motion nonoccurrence duration.

For example, if the second signal is not received within the motion nonoccurrence duration, the communication apparatus may determine that a user's entry does not occur. Therefore, the communication apparatus may not change the number of users who are present in the specific space.

If the second signal is received within the motion nonoccurrence duration, the communication apparatus may determine that a user's entry occurs. Therefore, depending on the user access direction, the communication apparatus may determine a user's presence. Details are the same as discussed above.

When the first signal is received at step S1510, the communication apparatus may trigger the third sensor at the subsequent step. The third sensor may include a door sensor or the like and may refer to a sensor for determining a degree of door opening.

After operating the third sensor, the communication apparatus may receive the third signal associated with a degree of door opening from the third sensor. After receiving the third signal, the communication apparatus may determine a user's entry using the received second and third signals.

The communication apparatus may store information about a correlation between a degree of door opening and a user's entry. The communication apparatus may also store threshold for a degree of door opening. Therefore, if a degree of door opening contained in the received third signal fails to exceed the stored threshold, the communication apparatus may determine that a user's entry does not occur, and thereby not operate the second sensor.

For example, if a user opens the door slightly so as to receive something from a housekeeper, the communication apparatus may determine that a user's entry does not occur since a degree of door opening is less than the threshold. Then the process is ended.

Meanwhile, if it is determined, based on the second signal, that a user's entry occurs, the communication may estimate the number of entering or exiting users, based on the distance information obtained through a distance sensor as discussed in FIG. 13. Therefore, using the estimated number of users, the communication apparatus may change the number of users who are present in the specific space. In this disclosure, the number of entering or exiting users refers to the number of users who enters or exits a specific space.

Figure 16:
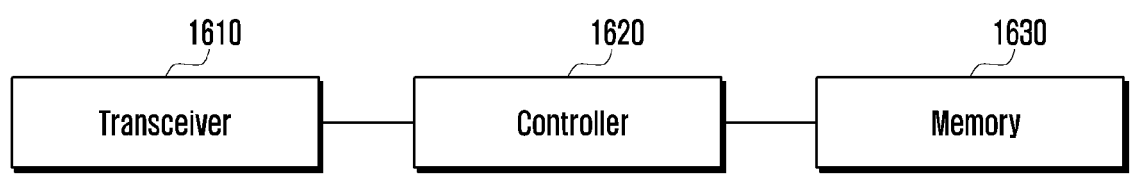
FIG. 16 is a block diagram illustrating an example communication apparatus according to an example embodiment of the present disclosure.

FIG. 16 is a block diagram illustrating an example communication apparatus according to an example embodiment of the present disclosure.

Referring to FIG. 16, the communication apparatus may include a transceiver (or communication unit, e.g., including communication circuitry) 1610, a controller (or control unit, e.g., including processing circuitry) 1620, and a memory (or storage unit) 1630.

The transceiver 1610 may include various communication circuitry configured to perform a communication with other network entities. The transceiver 1610 may receive measurement information from the sensors located in a specific space. Also, the transceiver 1610 may transmit control information to each electronic device.

The controller 1620 may include various processing circuitry configured to estimate the number of users located in the specific space. If a motion event or control event occurs simultaneously or within a specific time, the controller 1620 may estimate the number of users based on the number of occurrences of such events. Also, the controller 1620 may store the estimated number of users in the memory 1630.

The controller 1620 may determine the motion nonoccurrence duration information based on the sensing cycle, the presence decision time information, and accuracy. Also, the controller 1620 may determine the motion nonoccurrence duration information based on the estimated number of users. Also, the controller 1620 may determine the motion nonoccurrence duration information based on the number of sensors located in a specific space. Also, the controller 1620 may determine the motion nonoccurrence duration differently depending on the structure of a space.

The controller 1620 may set the motion nonoccurrence duration shortly according as there are many users.

The sensing cycle may refer to an interval of time during which a sensor such as a motion sensor does not operate. Also, the sensing cycle may change depending on situations. For example, when the door is opened, the controller 1620 may set the sensing cycle shortly so as to exactly determine a user's entry.

The controller 1620 that determines the motion nonoccurrence duration information may not perform sensing the occurrence of a motion event or control event during the sensing cycle after the door is closed. After the sensing cycle, the controller 1620 may sense a motion event or control event and, if there is no occurrence of motion event or control event during the motion nonoccurrence duration, determine that a user is absent.

The controller 1620 may determine a user's presence using created path information. Namely, if any motion event or control event does not occur in a section adjacent to a specific section after a motion event or control event occurs in the specific section, the controller 1620 may determine that a user is located in the specific section even though user's motion event or control event does not occur for a while.

Also, using a distance sensor contained in the door, the controller 1620 may determine a user's presence. The controller 1620 may determine a user's entry, based on a variation of distance information obtained through the distance sensor. For example, if the variation of distance information is smaller than zero, the controller may determine that a user exits the space. If the variation of distance information is greater than zero, the controller may determine that user enters the space.

Also, the controller 1620 may estimate the number of users, based on the number of inflection points on a distance information graph, and then change the number of users who are present in the space.

If it is determined that no user is present in the space, the controller 1620 may control the electronic device in the specific space.

Also, the controller 1620 may determine a user's entry, based on the sign of distance information obtained through a distance sensor. The distance sensor may set a distance, measured between a user outside of the door and the distance sensor, as a positive number. Therefore, the controller 1620 may trigger the distance sensor at the moment a user opens the door, and if the distance between the user and the sensor increases positively, determine that a user exits the space. On the other hand, if the distance between the user and the sensor increases negatively, the controller 1620 may determine that a user enters the space.

The controller may estimate the number of users using the distance information graph as discussed above, and then change the number of users who are present in the space.

Meanwhile, the controller 1620 may determine a user's entry through a touch part when a user opens the door. For example, if the touch part is an external knob of the door, the controller 1620 may determine that a user enters the space. If it is determined that a user enters the space, the controller may determine that a user is present.

If it is determined that a user exits the space, the controller 1620 may estimate the number of users. This estimation method is the same as discussed above.

Also, the controller 1620 may determine a user's entry using only information associated with the touch part or by combining this information with another information discussed above.

Meanwhile, the controller 1620 may determine a user's entry using angle information when a user opens the door. The memory 1630 may have information associated with the angle at which the door opens when a user exits the space and the angle at which the door opens when a user enters the space. Therefore, the controller 1620 may determine a user's entry based on such angle information. If it is determined that a user enters the space, the controller 1620 may determine that a user is present.

If it is determined that a user exits the space, the controller 1620 may estimate the number of users. This estimation method is the same as discussed above.

The memory 1630 may store information for determining a user's presence. The memory 1630 may also store the estimated number of users. Further, the memory 1630 may store the sensing cycle information and the presence decision time information. The stored sensing cycle information and presence decision time information may be used for determining the motion nonoccurrence duration information.

Additionally, the memory 1630 may store the path information associated with any adjacent section. In case of identifying a user's location using the path information, the memory 1630 may store the user's location information.

Additionally, the memory 1630 may store information associated with a door opening or closing angle when a user enters or exits the space.

Figure 17:
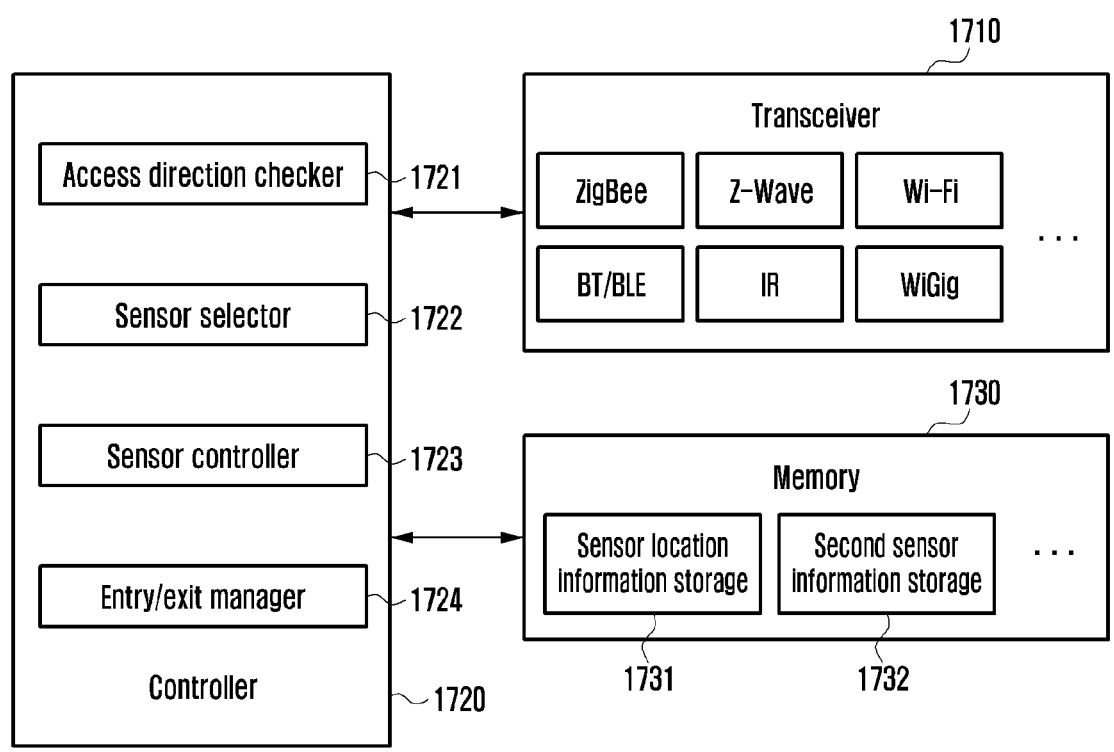
FIG. 17 is a block diagram illustrating an example communication apparatus according to an example embodiment of the present disclosure.

FIG. 17 is a block diagram illustrating an example communication apparatus according to an example embodiment of the present disclosure.

Referring to FIG. 17, the communication apparatus 1710 may include various communication circuitry, such as, for example, and without limitation, a transceiver 1710, a controller 1720, and a memory 1730.

The transceiver 1710 may include a plurality of modules including a variety of communication circuitry, such as, for example, and without limitation, a Bluetooth module, a Zigbee module, a Z-wave module, a Wi-fi module, an IR module, a WiGig module, and the like. The communication module 1710 may perform a communication with other entities using at least one of the above modules. For example, the transceiver 1710 may perform a communication with a sensor located in a specific space using the above communication technique.

The controller may include various processing circuitry, such as, for example, and without limitation, an access direction checker 1721, a sensor selector 1722, a sensor controller 1723, and an entry/exit manager 1724.

The access direction checker 1721 may receive the first signal from the first sensor, which is one of sensors located in the specific space, by controlling the transceiver 1710. For example, if a user's touch is inputted to the sensor located at the door, the controller 1720 may receive a signal created by the touch.

The access direction checker 1721 may identify the user access direction using the first signal. The controller 1720 may identify the location of the first sensor using a MAC address contained in the received first signal and identify the user access direction using the location of the first sensor.

For example, if the first sensor is located outside the specific space, the access direction checker 1721 may determine that the user access direction is an inward direction to the specific space.

The sensor selector 1722 may select the second sensor, based on the user access direction. If the user access direction is an outward direction from the specific space, the sensor selector 1722 may select, as the second sensor, at least one of the sensors located outside the specific space. In order to increase the accuracy of determination, the sensor selector 1722 may select two or more sensors as the second sensor.

The sensor controller 1723 may transmit a trigger command to the second sensor so as to change a sleep mode to a turn-on mode. The second sensor that receives the trigger command may change a sensor state to the turn-on state.

The entry/exit manager 1724 may receive the second signal sensed and created by the second sensor. The entry/exit manager 1724 may identify a user's entry using the second signal. If two or more sensors are selected as the second sensor, the entry/exit manager 1724 may determine user' entry or exit using the received information when the information received from two sensors is identical.

Also, the entry/exit manager 1724 may identify the number of users in the specific space, determine the motion nonoccurrence duration using the number of users, and identify a user's entry using the second signal received during the motion nonoccurrence duration. Details are the same as discussed above.

Also, when the first signal is received, the entry/exit manager 1724 may trigger the third sensor. The third sensor may include a door sensor or the like and may refer to a sensor for determining a degree of door opening.

The entry/exit manager 1724 may receive the third signal associated with a degree of door opening from the third sensor. After receiving the third signal, the entry/exit manager 1724 may determine a user's entry using the third signal. Specifically, if a degree of door opening contained in the third signal does not exceed a given threshold, the entry/exit manager 1724 may determine that a user's entry does not occur, and then end the process without selecting the second sensor.

Also, if it is determined that a user's entry occurs, the controller 1720 may identify the number of users using the distance sensor. Details are the same as discussed in FIG. 13. Using the number of users who enter or exit the space, the controller 172 may change the number of users who are present in the space. Then, based on the number of users who are present, the controller 172 may control the electronic devices located in the specific space.

The memory 1730 may store information required for determining a user's entry.

A sensor location information storage 1731 included in the memory 1730 may store sensor location information including information about a MAC address and location of each sensor. Therefore, the controller 1720 may identify the MAC address from the received signal and then determine the location of sensor using the sensor location information stored in the sensor location information storage 1731.

Also, a second sensor information storage 1732 included in the memory 1730 may store information about selectable sensors depending on the user access direction. Therefore, the controller 1720 may identify the user access direction and then select the second sensor using information stored in the second sensor information storage 1732.

While the present disclosure has been particularly illustrated and described with reference to various example embodiments thereof, it will be understood by those skilled in the art that various changes in form and details may be made therein without departing from the scope of the disclosure as defined by the appended claims.

What is claimed is:

1. A method for determining a user's presence in a specific space by a communication apparatus, the method comprising:
   receiving a first signal from a first sensor;
   identifying a user access direction, based on the received first signal;
   selecting a second sensor, based on the identified user access direction;
   receiving a second signal from the selected second sensor; and
   determining whether a user enters the specific space, based on the received second signal.

2. The method of claim 1, wherein selecting the second sensor comprises:
   transmitting a trigger command to the selected second sensor.

3. The method of claim 2, wherein receiving the first signal comprises:
   receiving a third signal from a third sensor; and
   determining a degree of door opening, based on the third signal.

4. The method of claim 3, wherein receiving the first signal further comprises:
   transmitting no trigger command to the second sensor when the degree of door opening is less than a predetermined threshold.

5. The method of claim 1, wherein identifying the user access direction comprises:
   determining a location of the first sensor using a sensor identifier included in the first signal; and
   identifying the user access direction, based on the location of the first sensor.

6. The method of claim 1, wherein determining whether the user enters the specific space comprises:
   identifying the number of users in the specific space;
   determining motion nonoccurrence duration information based on the number of users; and
   determining whether the user is located in the specific space, based on the motion nonoccurrence duration information.

7. The method of claim 6, wherein determining whether the user is located in the specific space is performed, depending on the identified user access direction and whether the second signal including information associated with a user's motion is received before the motion nonoccurrence duration information expires.

8. The method of claim 7, wherein determining whether the user is located in the specific space comprises:
   identifying the number of entering users using a distance sensor if the second signal including information associated with a user's motion is received before the motion nonoccurrence duration information expires.

9. A communication apparatus configured to determine a user's presence in a specific space, the apparatus comprising:
   a transceiver configured to transmit and receive a signal; and
   a controller configured to receive a first signal from a first sensor, to identify a user access direction based on the received first signal, to select a second sensor based on the identified user access direction, to receive a second signal from the selected second sensor, and to determine whether a user enters in the specific space based on the received second signal.

10. The apparatus of claim 9, wherein the controller is further configured to transmit a trigger command to the selected second sensor.

11. The apparatus of claim 10, wherein the controller is further configured to receive a third signal from a third sensor, and to determine a degree of door opening based on the third signal.

12. The apparatus of claim 11, wherein the controller is further configured to transmit no trigger command to the second sensor when the degree of door opening is less than a predetermined threshold.

13. The apparatus of claim 9, wherein the controller is further configured to determine a location of the first sensor using a sensor identifier included in the first signal, and to identify the user access direction based on the location of the first sensor.

14. The apparatus of claim 9, wherein the controller is further configured to identify the number of users in the specific space, to determine motion nonoccurrence duration information based on the number of users, and to determine whether the user is located in the specific space based on the motion nonoccurrence duration information.

15. The apparatus of claim 14, wherein the controller is further configured to determine the user's presence, depending on the identified user access direction and whether the second signal including information associated with a user's motion is received before the motion nonoccurrence duration information expires.

16. The apparatus of claim 15, wherein the controller is further configured to identify the number of entering users by using a distance sensor if the second signal containing information associated with a user's motion is received before the motion nonoccurrence duration information expires.

* * * * *